US012741220B2

(12) United States Patent
Li

(10) Patent No.: US 12,741,220 B2
(45) Date of Patent: Sep. 22, 2026

(54) MODULAR ASSEMBLED DISPLAY ASSEMBLY

(71) Applicant: Zhengzhou Zhangyu Electronic Technology Co., Ltd., Zhengzhou City (CN)

(72) Inventor: Jingzhao Li, Zhengzhou City (CN)

( * ) Notice: Subject to any disclaimer, the term of this patent is extended or adjusted under 35 U.S.C. 154(b) by 342 days.

(21) Appl. No.: 18/591,330

(22) Filed: Feb. 29, 2024

(65) Prior Publication Data

US 2024/0198241 A1 Jun. 20, 2024

(30) Foreign Application Priority Data

Feb. 24, 2024 (CN) ........................ 202410206225.6

(51) Int. Cl.
*A63F 13/92* (2014.01)

(52) U.S. Cl.
CPC .................................. *A63F 13/92* (2014.09)

(58) Field of Classification Search
CPC ...... A63F 13/24; A63F 13/2145; A63F 13/26; A63F 13/92; G07F 17/3209; G06F 1/1669; G06F 1/1632; G06F 1/1607
See application file for complete search history.

(56) References Cited

U.S. PATENT DOCUMENTS 7,347,780 B1 * 3/2008 Best ........................ A63F 13/52 463/31
7,445,551 B1 * 11/2008 Okada ................ A63F 13/2145 463/43
2008/0140959 A1 * 6/2008 Popell ................ G06F 11/1458 711/161
2012/0058821 A1 * 3/2012 Lan ........................ A63F 13/92 463/30
2015/0177783 A1 * 6/2015 Bragin .................. G09G 5/363 345/173
2017/0136353 A1 * 5/2017 Koizumi ................ A63F 13/23
2020/0184768 A1 * 6/2020 Tai ...................... G07F 17/3209
2021/0370175 A1 * 12/2021 Sato ........................ A63F 13/56
2023/0372818 A1 * 11/2023 Kando .................... A63F 13/52
2023/0372831 A1 * 11/2023 Kando .................. A63F 13/847
2025/0083058 A1 * 3/2025 Tai .......................... A63F 13/24

* cited by examiner

*Primary Examiner* — Ankit B Doshi
(74) *Attorney, Agent, or Firm* — Addison D. Ault; IPGentleman Intellectual Property Services, LLC

(57) ABSTRACT

The present disclosure provides a modular assembled display assembly (100), including: a display screen component (12) configured for displaying video to a user; and a multifunctional component (13) arranged on a side of the display screen component (12) away from the user and configured to provide power to the display screen component (12), wherein a combination of the display screen component (12) and the multifunctional component (13) is configured to realize a display function. The modular assembled display assembly of the present disclosure enables the Switch game console to simultaneously obtain high image quality in "TV mode" and portability with no need for indoor power supply, and it can be used as a portable independent display monitor.

5 Claims, 21 Drawing Sheets

14

18

18

MODULAR ASSEMBLED DISPLAY ASSEMBLY

CROSS-REFERENCE TO RELATED APPLICATION

This application claims priority to Chinese Patent Application No. 202410206225.6, filed on Feb. 24, 2024 before the China National Intellectual Property Administration, the disclosure of which is incorporated herein by reference in entirety.

TECHNICAL FIELD

The present disclosure relates to the field of game equipment or display equipment, and in particular to an accessory for Nintendo Switch Console, and specifically to a modular assembled display assembly.

BACKGROUND

As a popular game console, Switch Console is deeply loved by players. It has a special function of switching between "handheld mode" and "TV mode", providing players with different playing methods and gaming experiences in different usage scenarios. The main feature of its "handheld mode" is portability, it can be played anytime and anywhere; the use of "TV mode" requires connecting to a display device other than the game console. "TV mode" provides enhanced game quality and a better visual experience, but what follows is that this mode gives up portability, the display device needs to be connected/plugged into an "indoor power supply" (220V voltage for use in China and 110V voltage for use in the United States), and can only be used in fixed scenarios.

Some Switch game console players have given up using the lower-picture quality "handheld mode" due to the difference in picture quality between the two modes. Some players choose to carry a "portable display monitor" to travel and play, but it still cannot avoid the need for "indoor power supply". Therefore, for the current Switch game console, it cannot simultaneously enjoy the high picture quality of "TV mode" and the portability of being able to get away from indoor power supplies.

SUMMARY

The object of the present disclosure is to at least partially overcome the shortcomings of the prior art and provide a novel modular assembled display assembly.

Another object of the present disclosure is to provide a modular assembled display assembly so that the Switch game console can simultaneously obtain the high image quality of "TV mode" and the portability of being free from indoor power supply.

Yet another object of the present disclosure is to provide a modular assembled display assembly so that the Switch game console can obtain high picture quality and high visual experience in "TV mode" and at the same time operate in "handheld state" similar to "handheld mode".

Still another object of the present disclosure is to provide a modular assembled display assembly that can be used as a portable independent display monitor.

In order to achieve the above object or one of the objects, the technical solutions of the present disclosure are as follows:

A modular assembled display assembly, the display assembly includes:

a display screen component for displaying video to a user; and a multifunctional component disposed on a side of the display screen component away from the user and configured to provide power to the display screen component, wherein a combination of the display screen component and the multifunctional component is configured to realize a display function.

According to some embodiments of the present disclosure, the multifunctional component comprises a battery and/or a power interface;

the display assembly further comprises an electrical connector, configured to electrically connect the multifunctional component with the display screen component, so that the multifunctional component provides power to the display screen component.

According to some embodiments of the present disclosure, the electrical connector is a Type-C electrical connector, comprising:

a base block; and two spaced Type-C electrical plugs, parallel to each other and extending in the same direction from the base block, wherein the display screen component and the multifunctional component are respectively provided with a first electrical socket and a second electrical socket which are each Type-C type.

According to some embodiments of the present disclosure, the multifunctional component comprises a voltage controller configured to distribute voltage to the second electrical socket and other electrical parts in the multifunctional component.

According to some embodiments of the present disclosure, the display assembly further comprises:

at least one gamepad connector configured to be connected to a gamepad, and to be connected to the display screen component, the multifunctional component and a game console, so that the gamepad, gamepad connector, display screen component, game console and multifunctional component form a whole;

a video transmitter configured to connect the multifunctional component with the display screen component, so that the multifunctional component provides video signal to the display screen component; and a connecting part configured for connecting the game console with the multifunctional component, and the connecting part supports current transmission and video signal transmission.

According to some embodiments of the present disclosure, the multifunctional component further comprises a video signal conversion member configured to convert video signals into signals suitable for reception by the display screen component.

According to some embodiments of the present disclosure, the display assembly has a display state and a handheld state;

in the display state, the display screen component and the multifunctional component are close to each other and combined as a display;

in the handheld state, the gamepad connector, display screen component, multifunctional component, video transmitter, electrical connector, and connecting part are connected to the game console and the gamepad to form a whole and work as a handheld game console.

According to some embodiments of the present disclosure, the game console is a Switch game console, and the gamepad is a Switch gamepad.

According to some embodiments of the present disclosure, in the handheld state, the Switch game console works in a TV mode.

According to some embodiments of the present disclosure, in the handheld state, an accommodation space is formed between the display screen component and the multifunctional component so as to accommodate the game console.

According to some embodiments of the present disclosure, the display assembly includes two electrical connectors, a first electrical connector and a second electrical connector, and a distance between two electrical plugs of the first electrical connector is less than a distance between two electrical plugs of the second electrical connector;

the first electrical connector is configured to electrically connect the multifunctional component with the display screen component in the display state, and the second electrical connector is configured to electrically connect the multifunctional component with the display screen component in the handheld state.

According to some embodiments of the present disclosure, the video transmitter is a mini HDMI video transmitter, including:

a base block; and two spaced mini HDMI video signal plugs, parallel to each other and extending in the same direction from the base block, the display screen component and the multifunctional component are respectively provided with a first video socket and a second video socket which are each mini HDMI-type.

According to some embodiments of the present disclosure, the connecting part is a Type-C full-function connecting part, including:

a base block; and two spaced Type-C male plugs, parallel to each other and extending in the same direction from the base block, the multifunctional component is provided with a Type-C full-function connecting socket.

According to some embodiments of the present disclosure, a limiting member is provided between the two male plugs of the connecting part to limit a displacement of the game console.

According to some embodiments of the present disclosure, the video transmitter and/or the electrical connector is provided with an indicating mark; and/or the connecting part is provided with a power indicator.

According to some embodiments of the present disclosure, first slide rails or first slideways are respectively provided on both sides of the display screen component; and a connection socket or a connection plug is provided on a side of the display screen component.

According to some embodiments of the present disclosure, the display screen component is provided with a power switch, a headphone jack and/or function keys.

According to some embodiments of the present disclosure, one or more recesses are provided in the side of the display screen component away from the user, so that when the game console is accommodated in the accommodation space, there is a gap/gaps between the game console and the display screen component to facilitate heat dissipation.

According to some embodiments of the present disclosure, the display screen component includes a frame and a back panel connected with the frame, a first air inlet is provided in the back panel, and a first air outlet is provided in the frame;

a first fan is provided inside the display screen component.

According to some embodiments of the present disclosure, at least one protrusion or groove is provided in the side of the display screen component facing away from the user; and at least one groove or protrusion is provided on the side of the multifunctional component facing the display screen component.

According to some embodiments of the present disclosure, a video driver is provided inside the display screen component, and the video driver is configured to process the video signal received by the display screen component into a signal suitable for display by the display screen component.

According to some embodiments of the present disclosure, second slide rails or second slideways are respectively provided on both sides of the multifunctional component.

According to some embodiments of the present disclosure, the multifunctional component is provided with a notch, and the notch corresponds to the cassette slot of the game console.

According to some embodiments of the present disclosure, a second air inlet is provided in the side of the multifunctional component away from the display screen component, a second air outlet is provided in the side edge of the multifunctional component; and a second fan is provided inside the multifunctional component; and/or the multifunctional component is provided with a penetrate-through vent, which corresponds to a cooling air inlet of the game console.

According to some embodiments of the present disclosure, a plurality of stand slots are provided in the side of the multifunctional component away from the display screen component.

According to some embodiments of the present disclosure, at least part of the stand slots are provided in the vent.

According to some embodiments of the present disclosure, the display assembly further includes a stand, and the stand includes:

an upright strut, with a sliding chute;

two supporting feet, disposed at the lower end of the upright strut;

a positioning element, disposed in the sliding chute and configured to be slidable and fixable in the sliding chute;

a damping hinge attached to the positioning element so that the damping hinge can be adjusted in height as the positioning element moves;

a fixing plate attached to the damping hinge;

at least one lower clamping jaw provided on the fixing plate;

at least one upper clamping jaw provided on the fixing plate; and an adjusting element, wherein at least one of the lower clamping jaw and the upper clamping jaw is a movable clamping jaw, and the adjusting element is provided on the movable clamping jaw to adjust a distance between the lower clamping jaw and the upper clamping jaw.

According to the modular assembled display assembly of the present disclosure, while the Switch game console is turned on in "TV mode", it is powered by a battery, with reasonable voltage distribution, the "indoor power supply"

may be discarded, thereby the Switch game console may be portably operated in "TV mode" anytime and anywhere. Moreover, under the modular design, the modular assembled display assembly of the present disclosure can be assembled into two different forms through disassembly and assembly, "handheld state" and "display state". In the "handheld state" of the present disclosure, it forms a new "handheld mode" by "nesting and superimposing" with the Switch game console, allowing it to run and display in "TV mode", but retaining the handheld state/handheld mode; in the "display state" of the present disclosure, it is transformed into an independent display, which has the complete functions of an ordinary display, and it realizes portable applications in multiple scenarios.

In addition, the modular assembled display assembly of the present disclosure is simple to operate, compact in size, and easy to carry, it adopts a slide rail installation method, has an ingenious structural design, realizes modular design, and has a reasonable heat dissipation method.

REFERENCE NUMERAL

Figure 1:
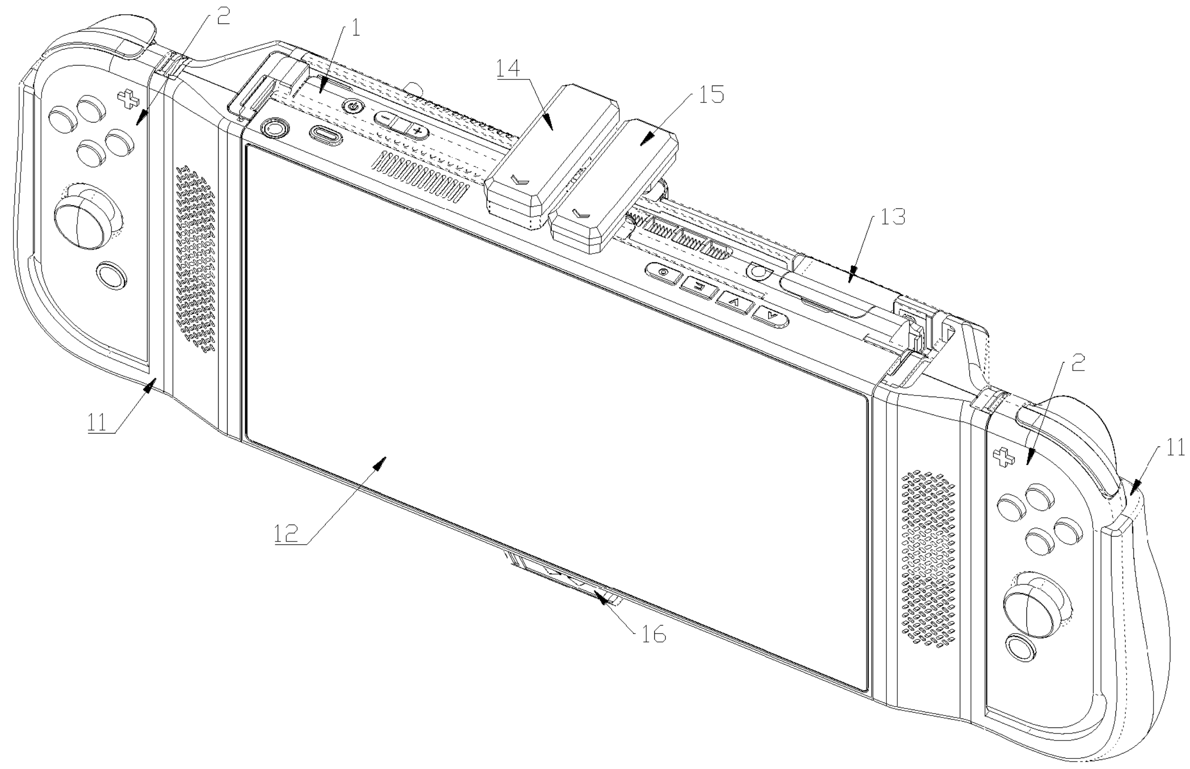
FIG. 1 is a schematic view of a modular assembled display assembly in a handheld state according to an embodiment of the present disclosure.

100 display assembly; 1 game console; 2 gamepad; 11 gamepad connector; 12 display screen component; 13 multifunctional component; 14 video transmitter; 15 electrical connector; 16 connecting part; 17 speaker; 18 stand; 21 palm rest; 22 gamepad slot; 23 loudspeaker; 24 first slideway; 25 limit seat; 26 first connection plug; 27 limit piece; 28 second slideway; 29 first lock buckle; 30 second lock buckle; 31 first housing; 32 second housing; 33 circuit board; 34 fixing post; 35 fixing hole; 41 frame; 42 display screen; 43 first slide rail; 44 connection socket; 45 power switch; 46 headphone jack; 47 function button; 48 first air outlet; 49 first video socket; 50 first electrical socket; 51 back panel; 52 protrusion; 53 first air inlet; 54 video driver; 55 recess; 56 first fan; 61 case; 62 sealing plate; 63 second slide rail; 64 groove; 65 connecting socket; 66 notch; 67 second video socket; 68 second electrical socket; 69 vent; 70 battery; 71 second air inlet; 72 second air outlet; 73 stand slot; 74 switch button; 75 indicator light; 76 power interface; 77 second fan; 78 video signal conversion member; 79 voltage controller; 81 base block; 82 video signal plug; 83 indicating mark; 84 electrical plug; 85 male plug; 86 limiting member; 87 power indicator; 91 base casing; 92 speaker mesh; 93 inner slideway; 94 second connection plug; 95 third lock buckle; 101 upright strut; 102 supporting foot; 103 fixing plate; 104 lower clamping jaw; 105 upper clamping jaw; 106 adjusting element; 107 positioning element; 108 sliding chute; 109 damping hinge.

DETAILED DESCRIPTION OF EMBODIMENTS

Exemplary embodiments of the present disclosure are described in detail below with reference to the accompanying drawings, in which the same or similar reference numerals represent the same or similar elements. Additionally, in the following detailed description, for convenience of explanation, numerous specific details are set forth to provide a comprehensive understanding of the disclosed embodiments. It will be apparent, however, that one or more embodiments may be practiced without these specific details. In other instances, well-known structures and devices are schematically illustrated in order to simplify the drawings.

The modular assembled display assembly of the present disclosure is an accessory that can be used in Switch game device, meanwhile it can also be used independently as a display. It is a mini display, when used as a display, it is not limited to use with Switch game devices.

As mentioned in the "BACKGROUND" section, when the Switch game console is used in "TV mode", it requires an external display device, for example, an external TV or other display monitor. However, the existing external display devices generally have problems of large size, many accessories, cumbersome cable connections, need for an external power supply, and fixed usage scenarios. In this context, the present disclosure provides the following usage method: while the Switch game console is turned on in "TV mode", it is powered by a battery, with reasonable voltage distribution, the "indoor power supply" may be discarded, thereby the Switch game console may be portably operated in "TV mode" anytime and anywhere. Moreover, under the modular design, the modular assembled display assembly of the present disclosure can be assembled into two different forms through disassembly and assembly, "handheld state" and "display state". In the "handheld state" of the present disclosure, it forms a new "handheld mode" by "nesting and superimposing" with the Switch game console, allowing it to run and display in "TV mode", but retaining the handheld state/handheld mode; in the "display state" of the present disclosure, it is transformed into an independent display, which has the complete functions of an ordinary display, and it realizes portable applications in multiple scenarios.

Figure 2:
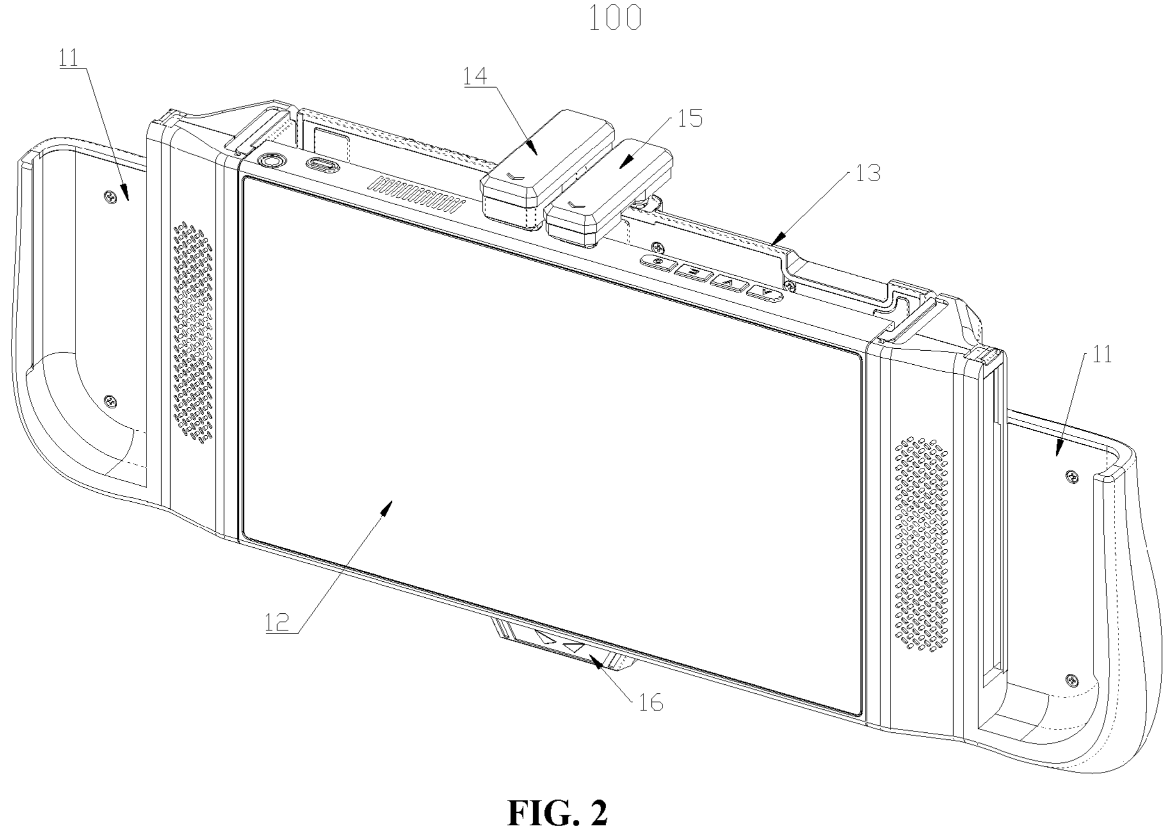
FIG. 2 is a schematic view of a modular assembled display assembly in a handheld state according to an embodiment of the present disclosure, in which the game console and gamepad are removed.
Figure 3:
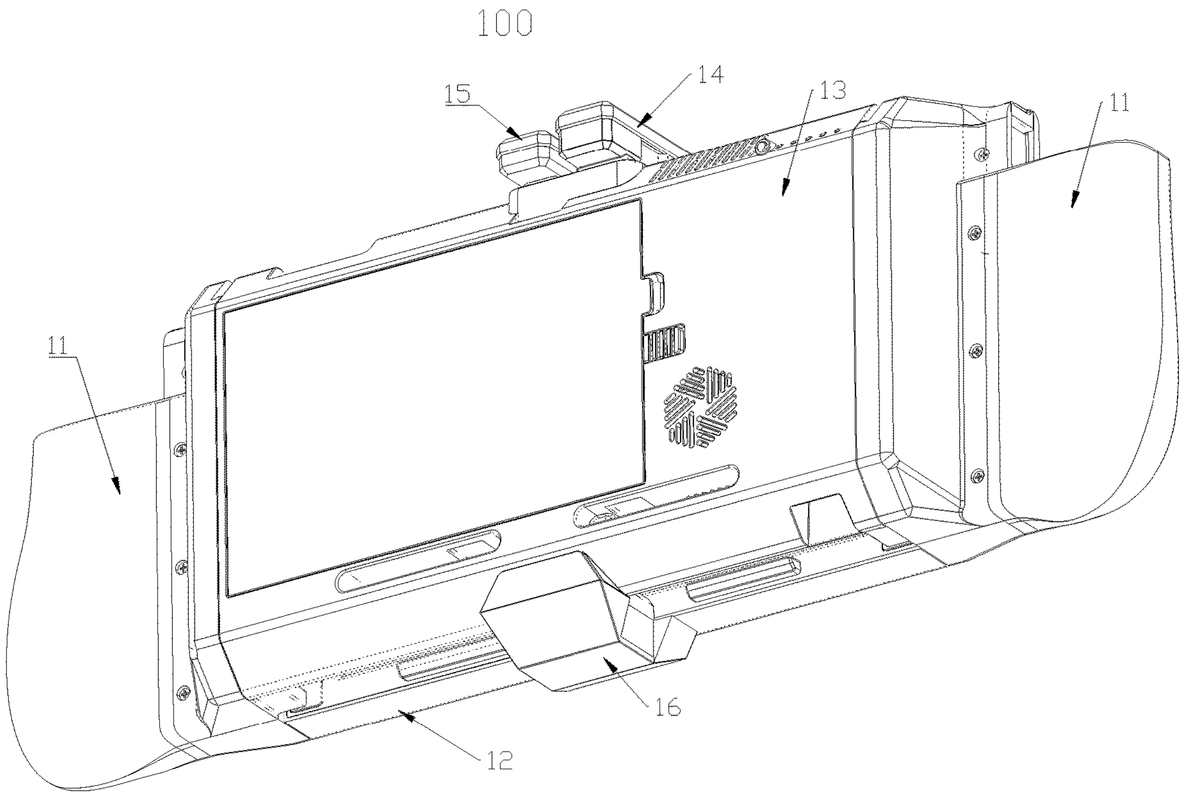
FIG. 3 shows a modular assembled display assembly in a handheld state according to an embodiment of the present disclosure from the back side.
Figure 4:
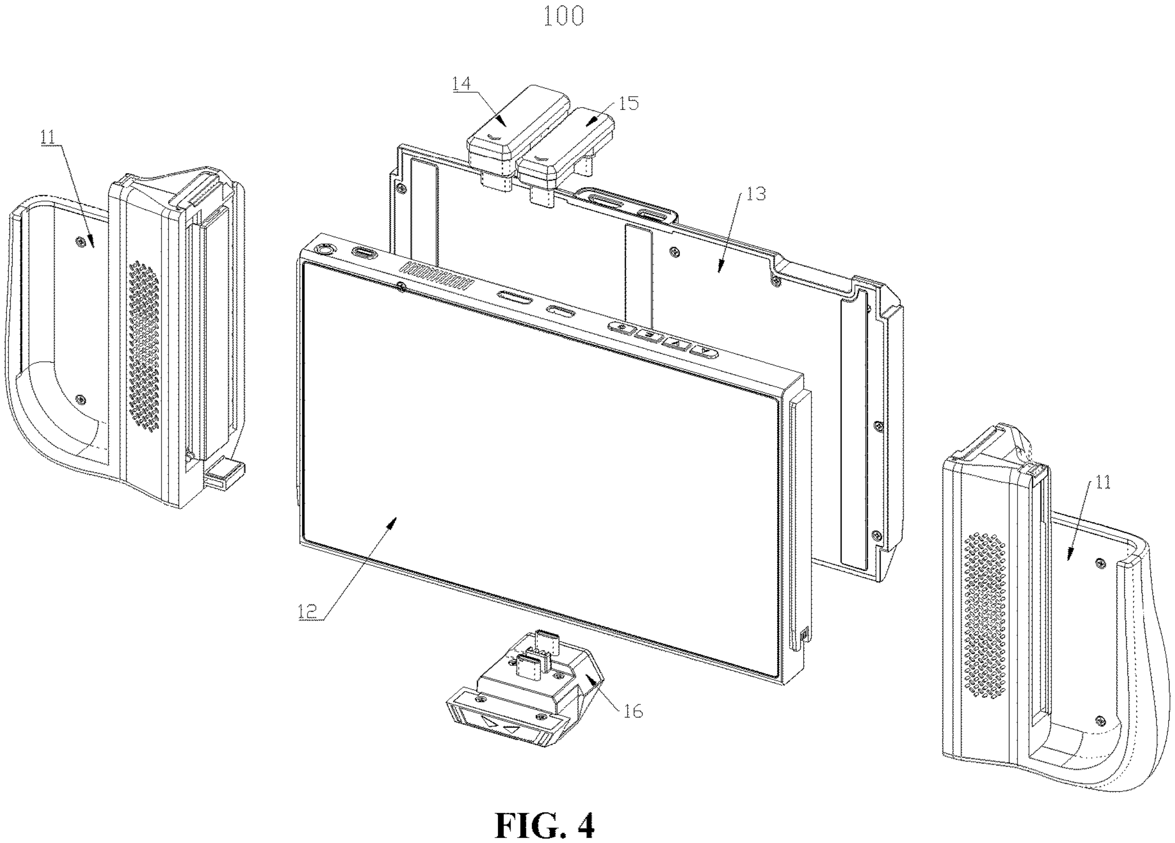
FIG. 4 shows an exploded view of a modular assembled display assembly in a handheld state according to an embodiment of the present disclosure.

As an optional embodiment, the modular assembled display assembly 100 of the present disclosure mainly includes a gamepad connector 11, a display screen component 12, a multifunctional component 13, a video transmitter 14, an electrical connector 15, a connecting part 16, a speaker 17 and a stand 18, as shown in FIGS. 1 and 2. It should be noted that the display assembly including all these components is for an optional embodiment of the present disclosure, which does not mean that the modular assembled display assembly of the present disclosure must include all these components. The present disclosure also relates to a game console 1 and a gamepad 2, which are used in conjunction with the display assembly 100 to implement game functions. Herein, the game console 1 is a Switch game console, the gamepad 2 is a Switch gamepad, the number of the gamepads 2 is two, and the two gamepads 2 can be attached to the left and right sides of the game console 1.

Figure 5:
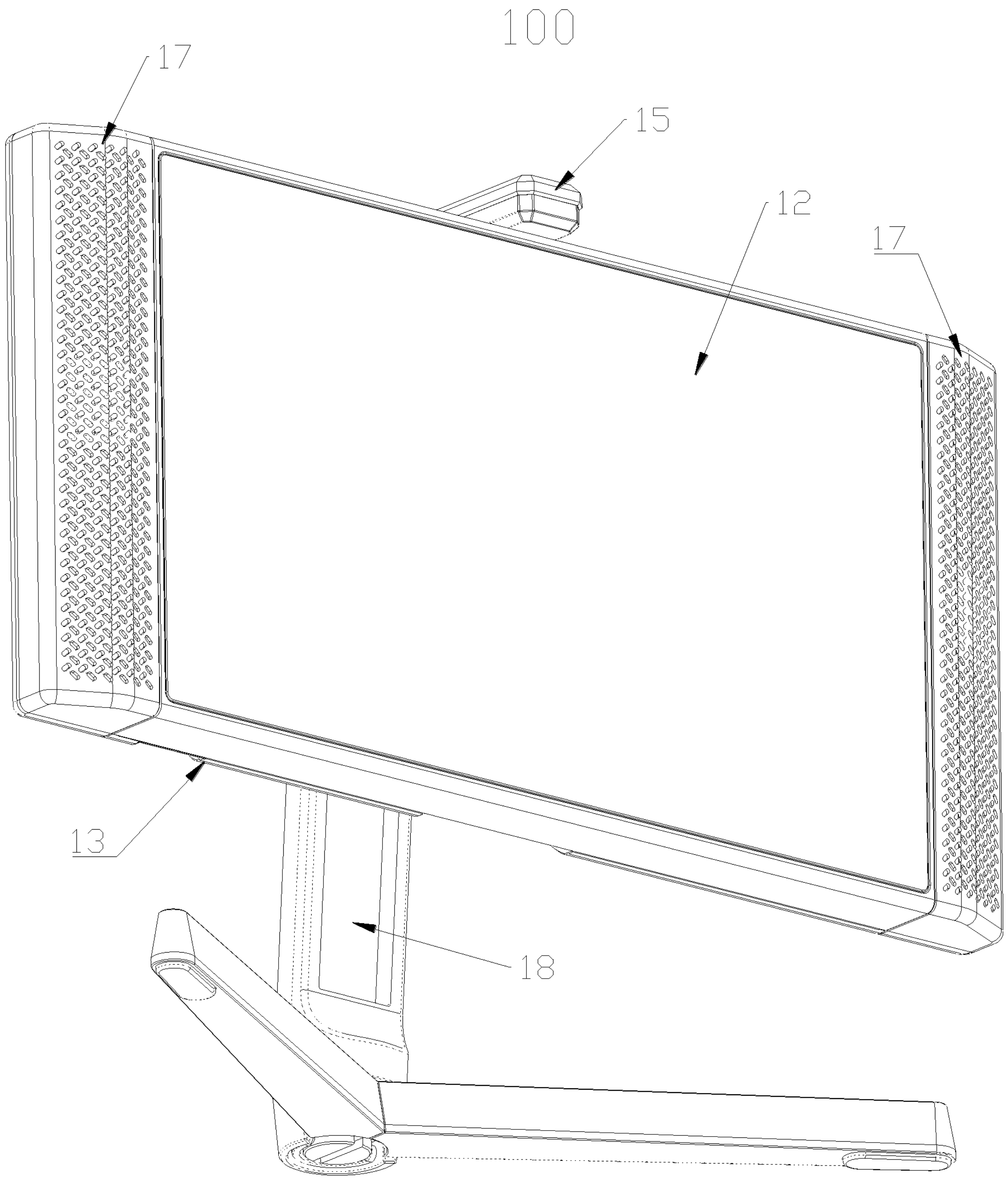
FIG. 5 is a schematic view of a modular assembled display assembly in a display state according to an embodiment of the present disclosure.
Figure 6:
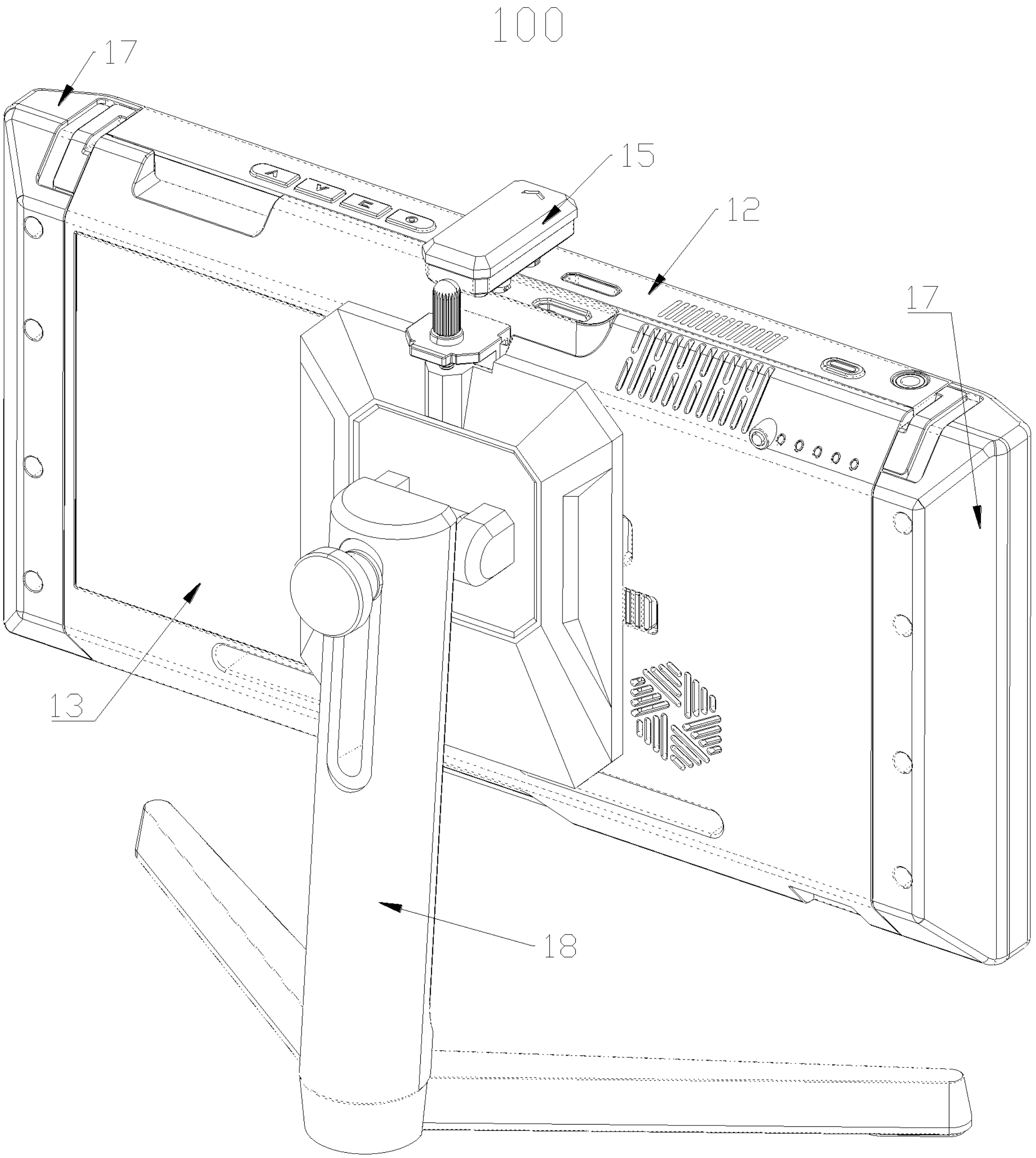
FIG. 6 shows a modular assembled display assembly in a display state according to an embodiment of the present disclosure from the back side.
Figure 7:
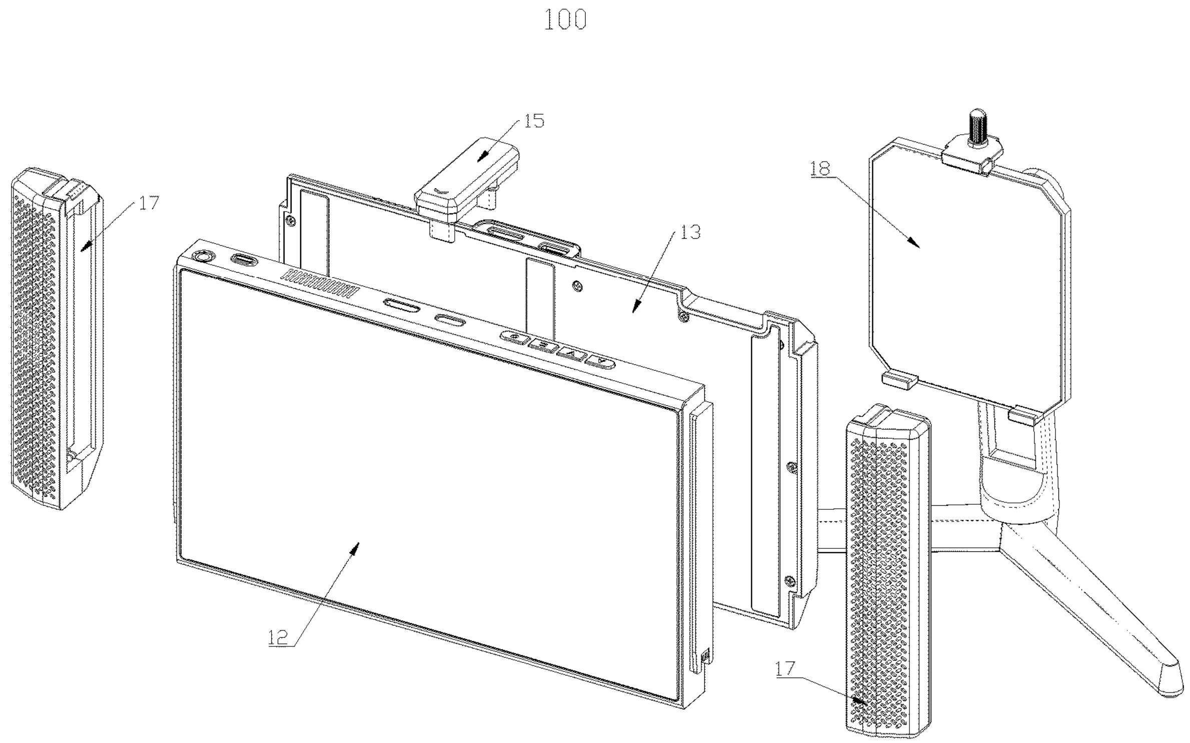
FIG. 7 shows an exploded view of a modular assembled display assembly in a display state according to an embodiment of the present disclosure.
Figure 8:
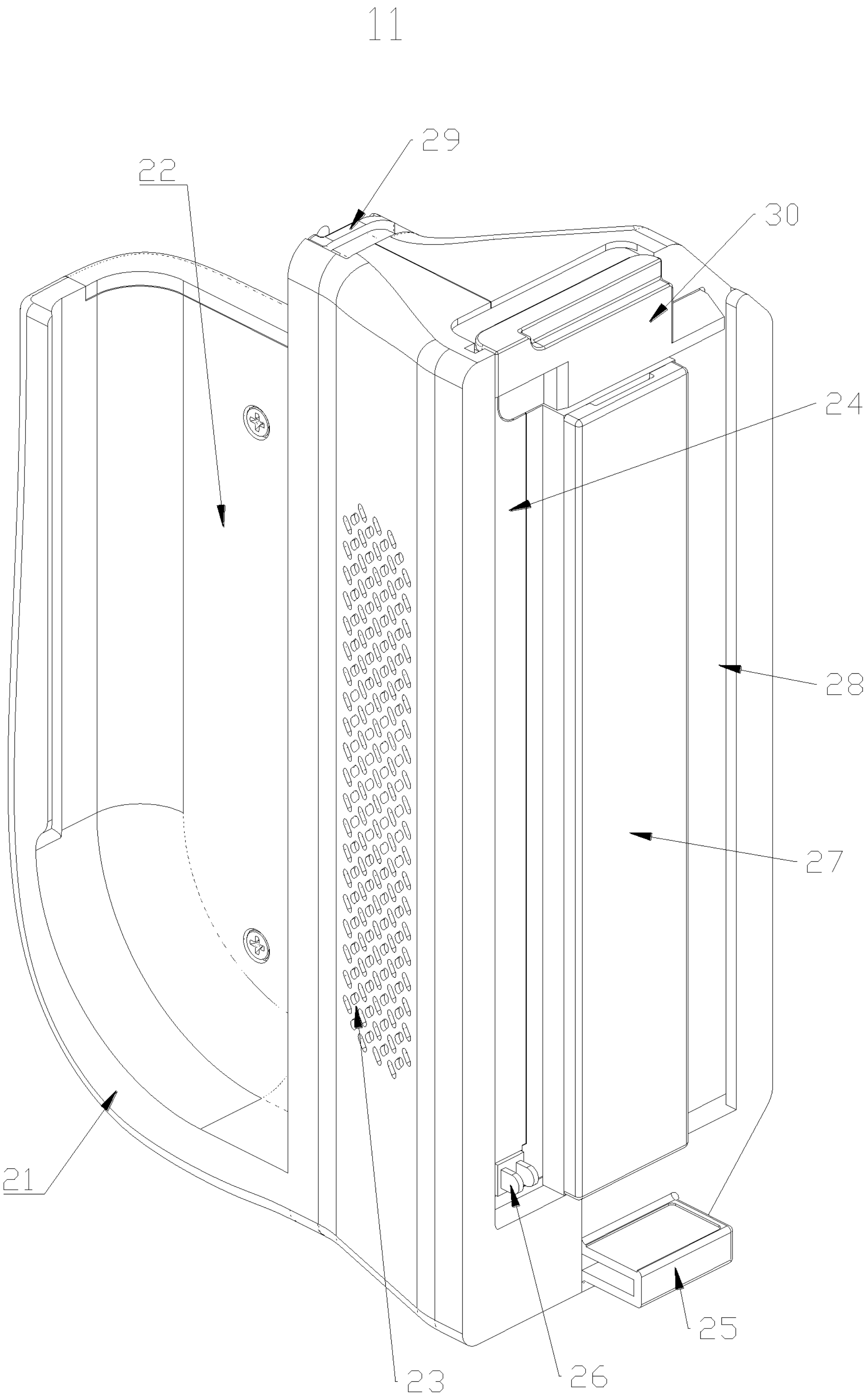
FIG. 8 is a schematic view of a gamepad connector for a gaming device according to an embodiment of the present disclosure.
Figure 9:
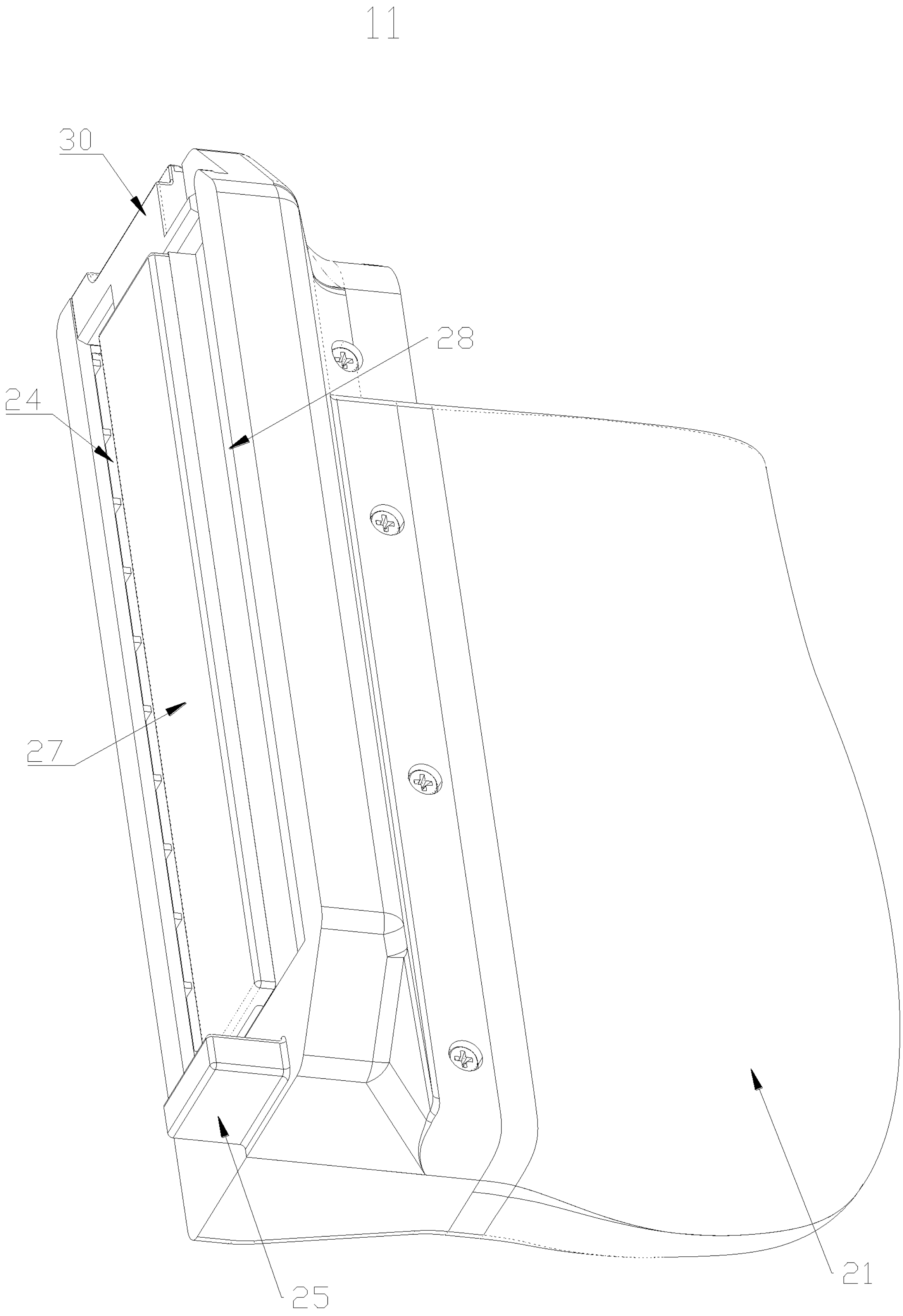
FIG. 9 shows a gamepad connector for a gaming device according to an embodiment of the present disclosure from the back side.
Figure 10:
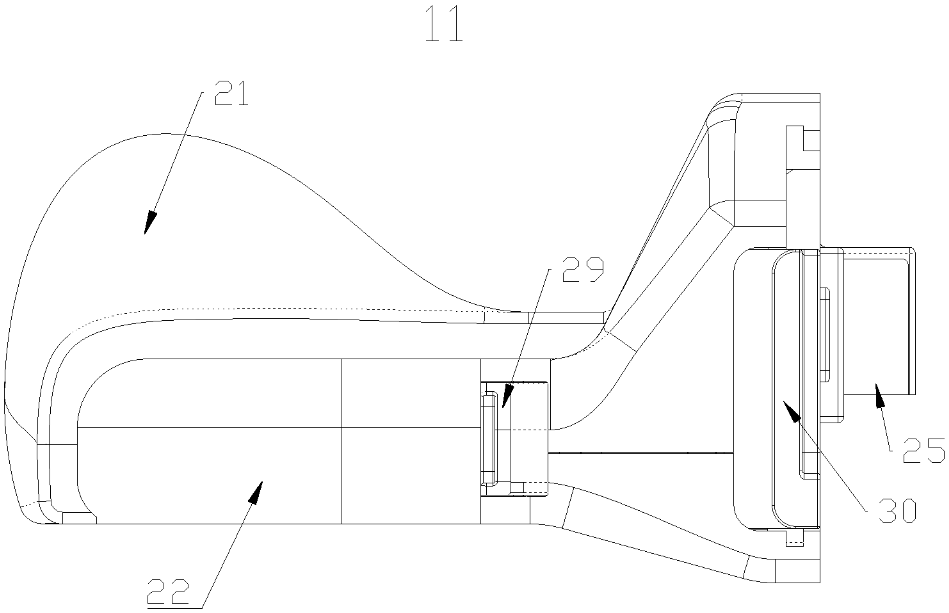
FIG. 10 is a top view of a gamepad connector for a gaming device according to an embodiment of the present disclosure.
Figure 11:
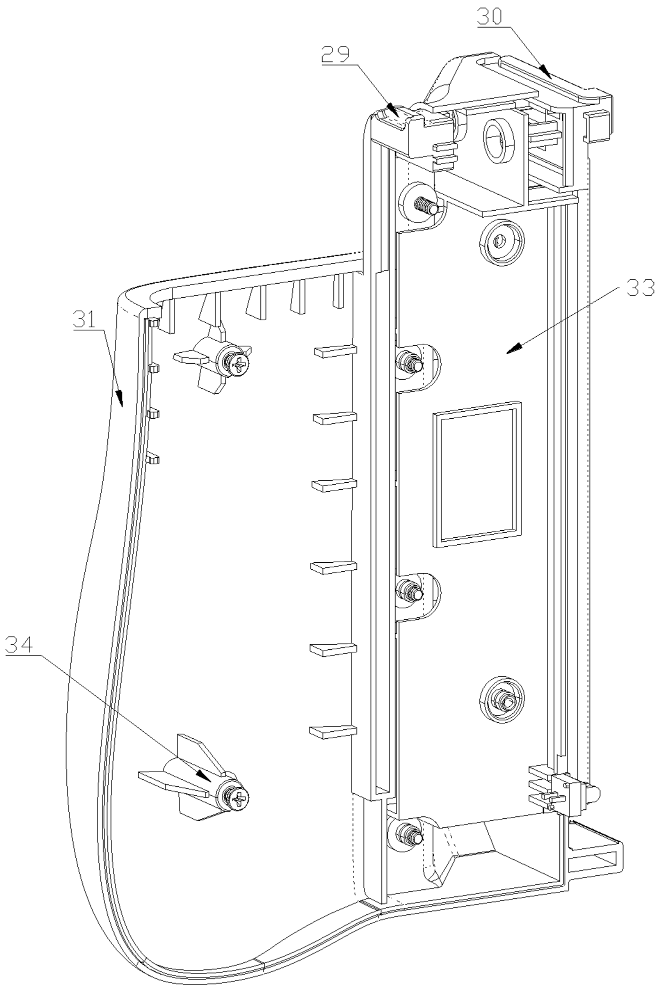
FIG. 11 shows the internal structure of a first housing of a gamepad connector for a gaming device according to an embodiment of the present disclosure.
Figure 12:
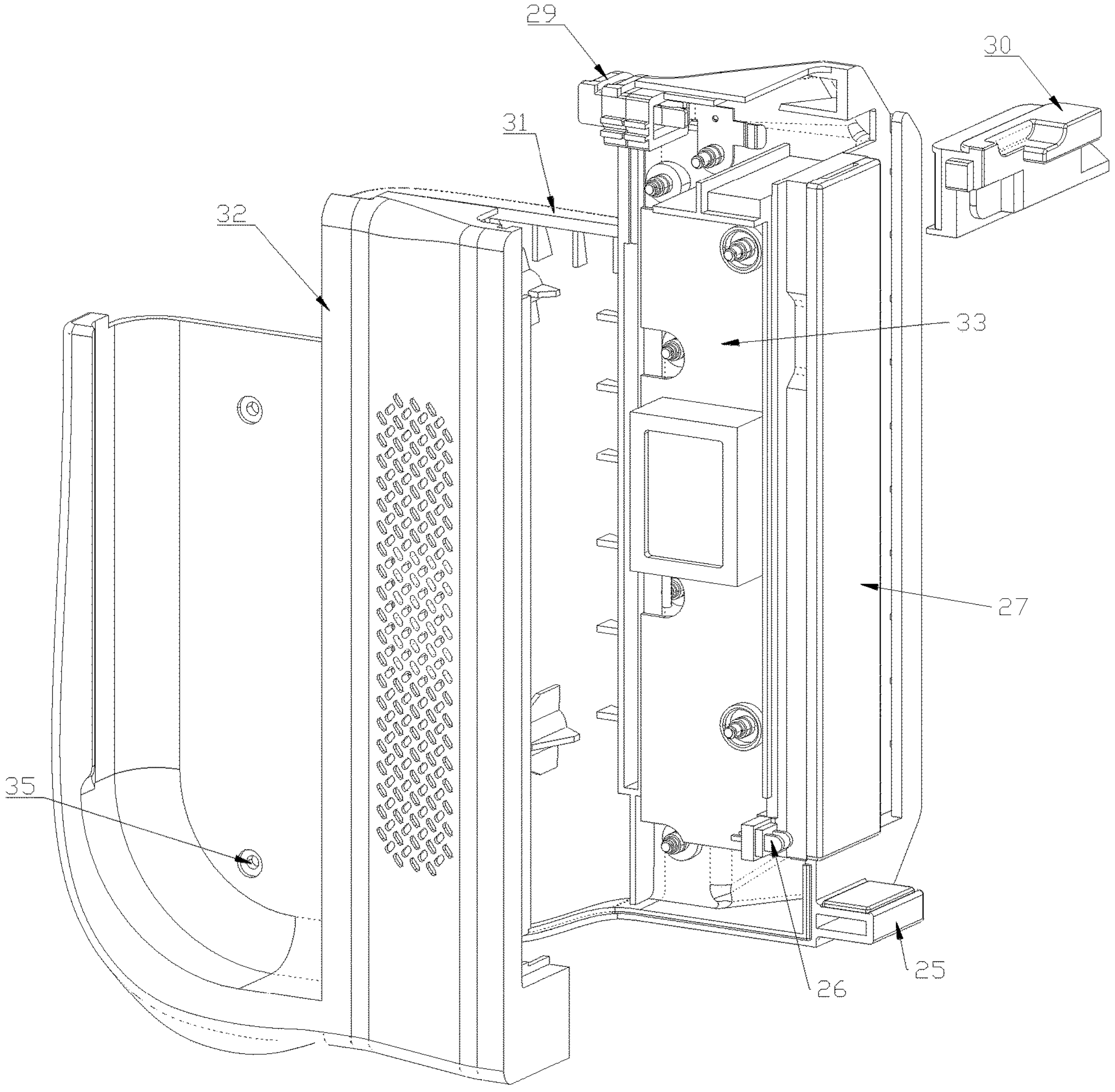
FIG. 12 illustrates a gamepad connector for a gaming device according to an embodiment of the present disclosure in an exploded view.

The display assembly 100 of the present disclosure has a display state and a handheld state. In the display state, the display screen component 12 and the multifunctional component 13 are close to each other and combined as a display monitor, as shown in FIGS. 5-7, the display screen component 12 is used to display videos to a user, and the multifunctional component 13 is disposed on the side of the display screen component 12 facing away from the user, the multifunctional component 13 is configured to provide power to the display screen component 12, wherein the combination of the display screen component 12 and the multifunctional component 13 can implement a display function. The display screen component 12 and the multifunctional component 13 are combined together through two speakers 17 and can be fixed on the stand 18.

In the handheld state, the gamepad connector 11, display screen component 12, multifunctional component 13, video transmitter 14, electrical connector 15, and connecting part 16 can integrated with the game console 1 and the gamepad 2 as a whole, working as a handheld game console, as shown in FIGS. 1-4. It should be noted that in the handheld state, the Switch game console works in TV mode. Below, each component will be introduced individually.

Figure 13:
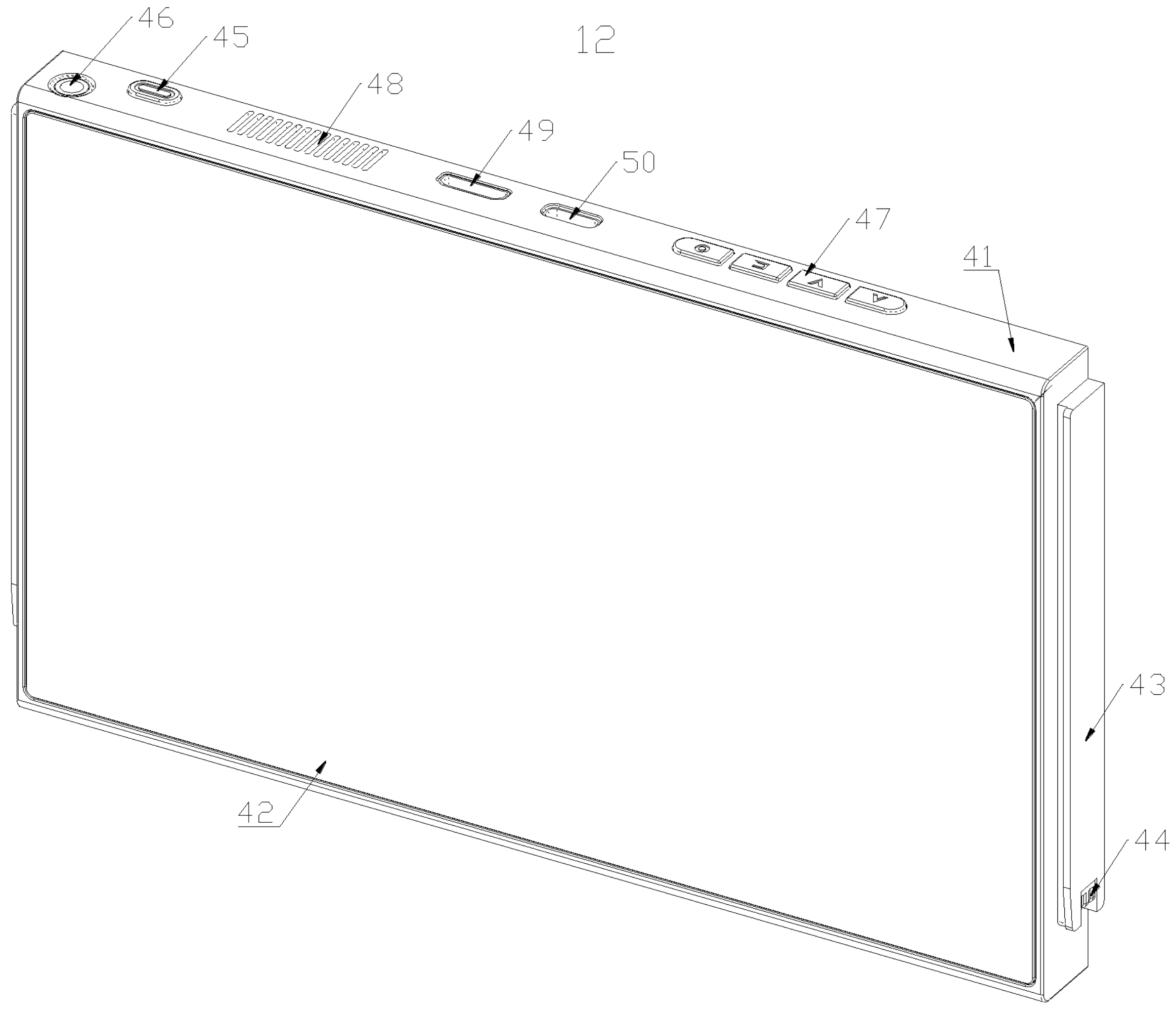
FIG. 13 is a schematic view of a display screen component of a modular assembled display assembly according to an embodiment of the present disclosure.
Figure 14:
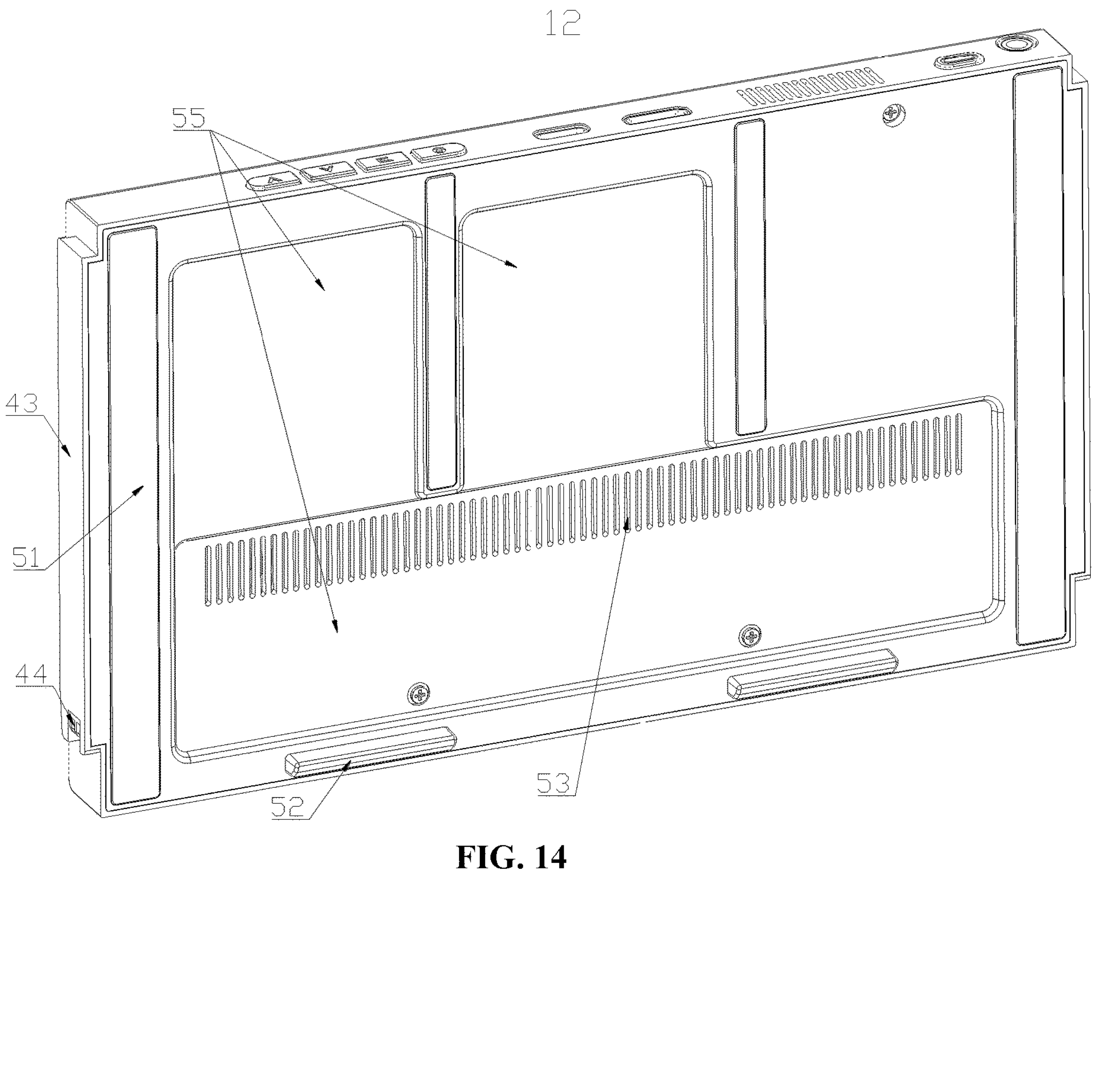
FIG. 14 shows a display screen component of a modular assembled display assembly according to an embodiment of the present disclosure from the back side.
Figure 15:
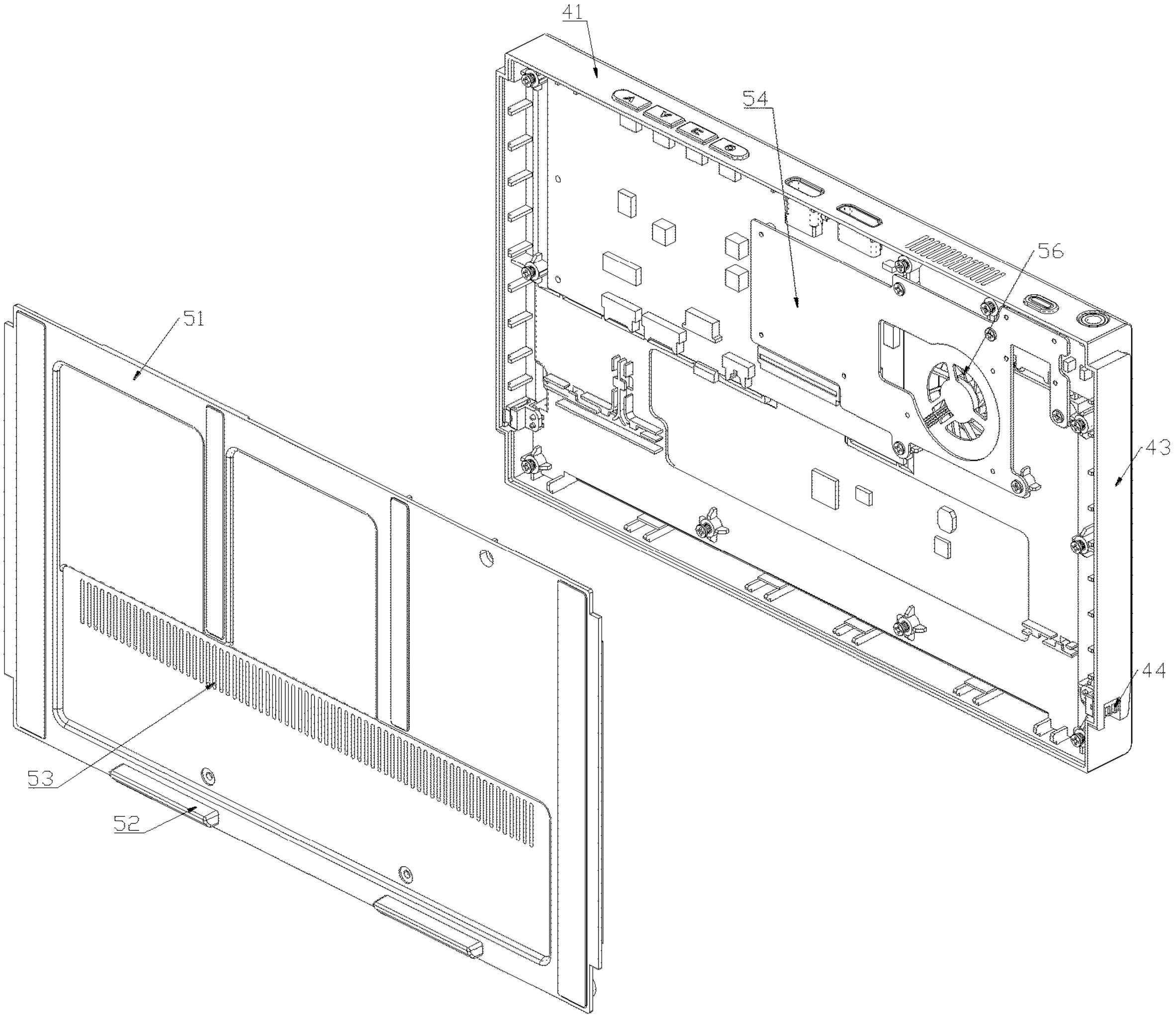
FIG. 15 shows an exploded view of a display screen component of a modular assembled display assembly according to an embodiment of the present disclosure.
Figure 16:
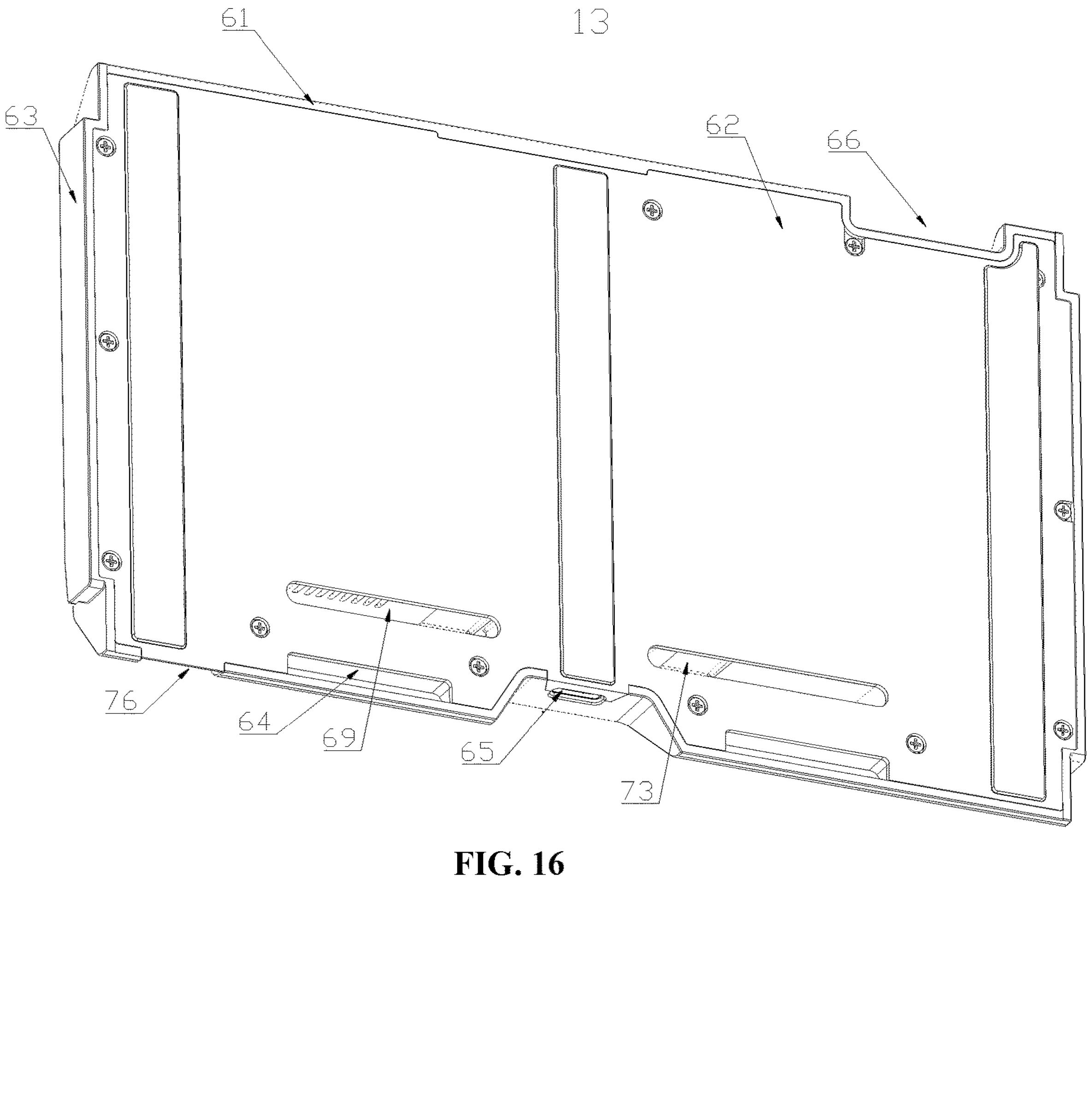
FIG. 16 is a schematic view of a multifunctional component of a modular assembled display assembly according to an embodiment of the present disclosure.
Figure 17:
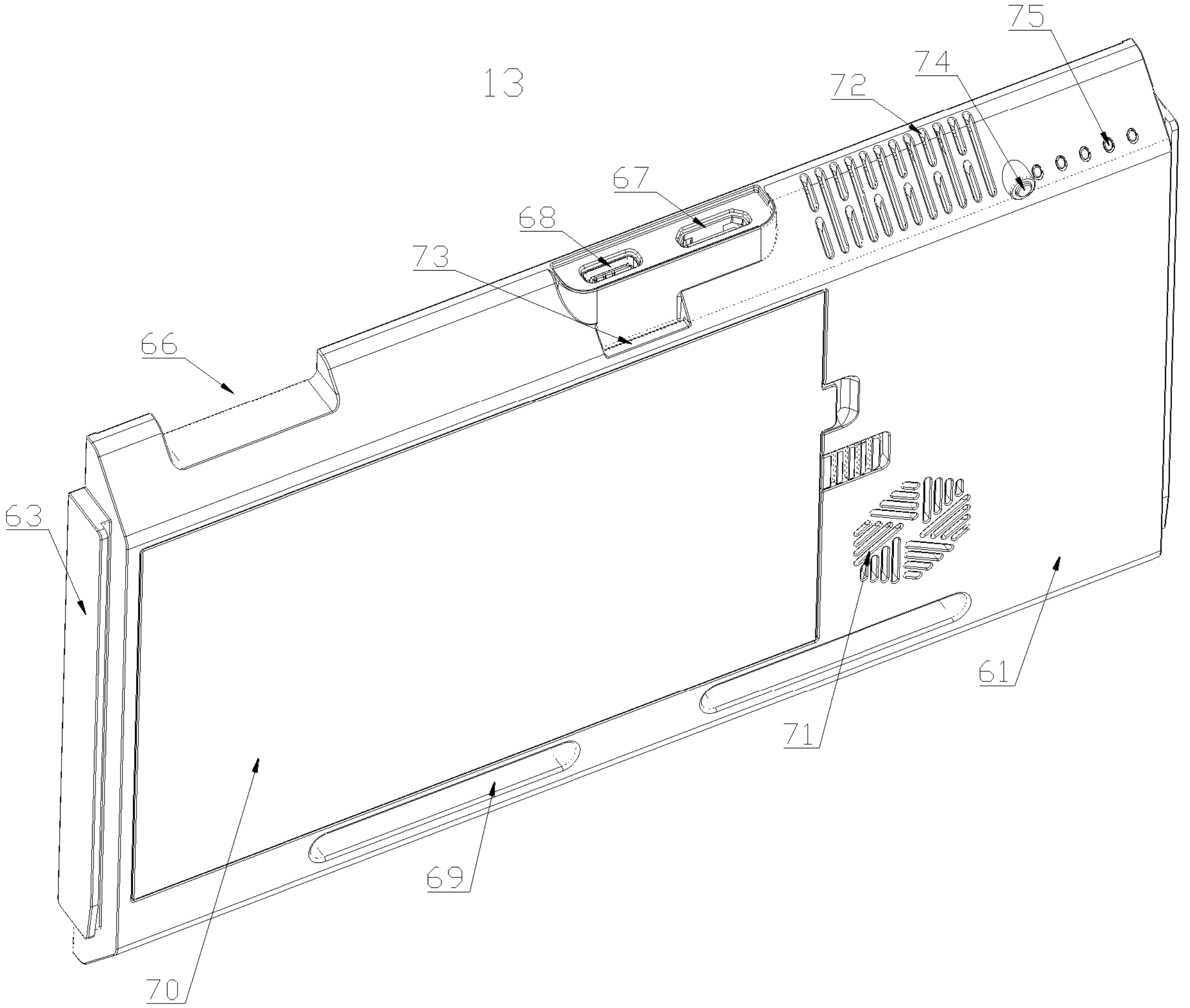
FIG. 17 shows a multifunctional component of a modular assembled display assembly according to an embodiment of the present disclosure from the back side.
Figure 18:
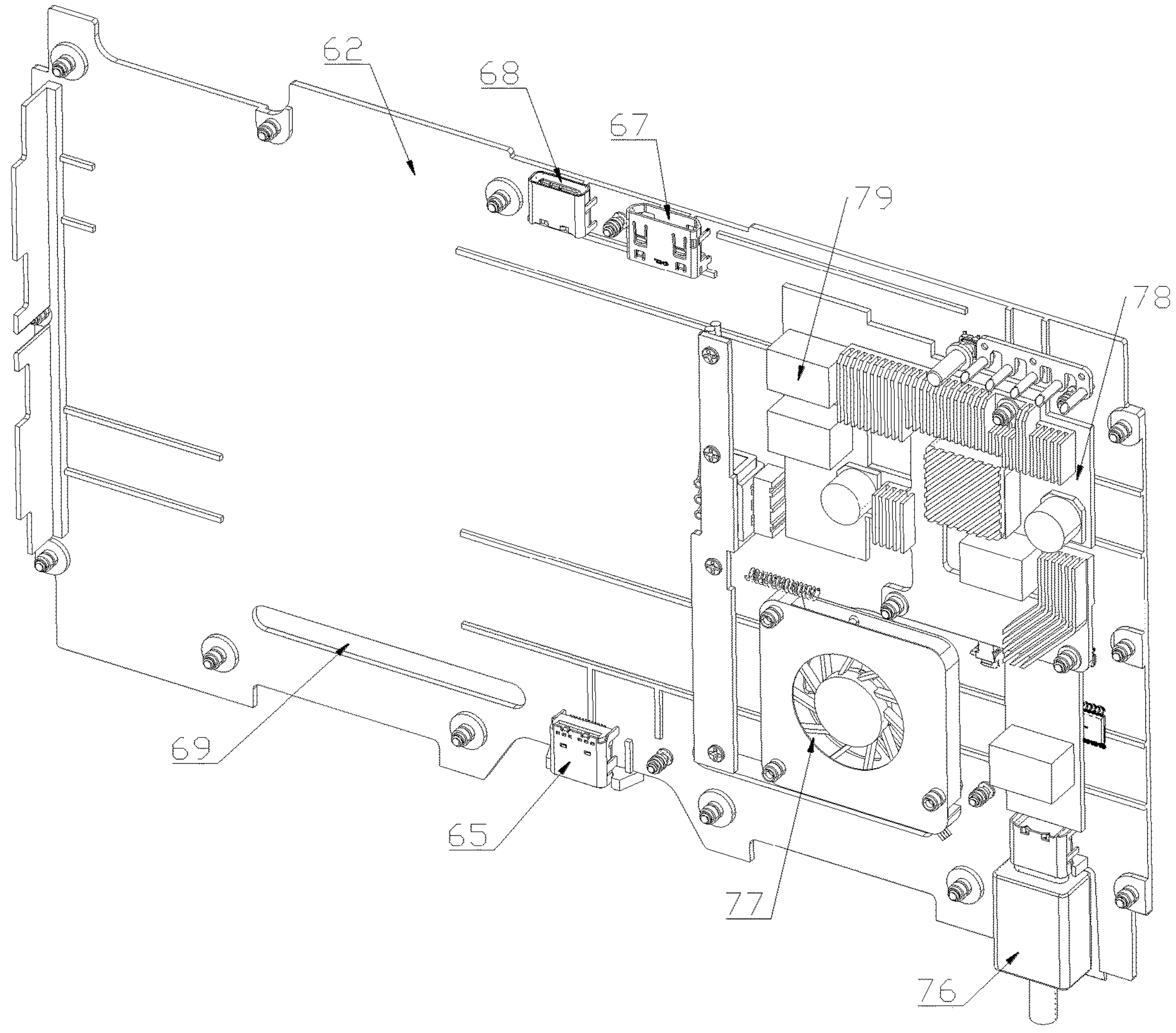
FIG. 18 shows the structure of a sealing plate of a multifunctional component of a modular assembled display assembly according to an embodiment of the present disclosure.
Figure 19:
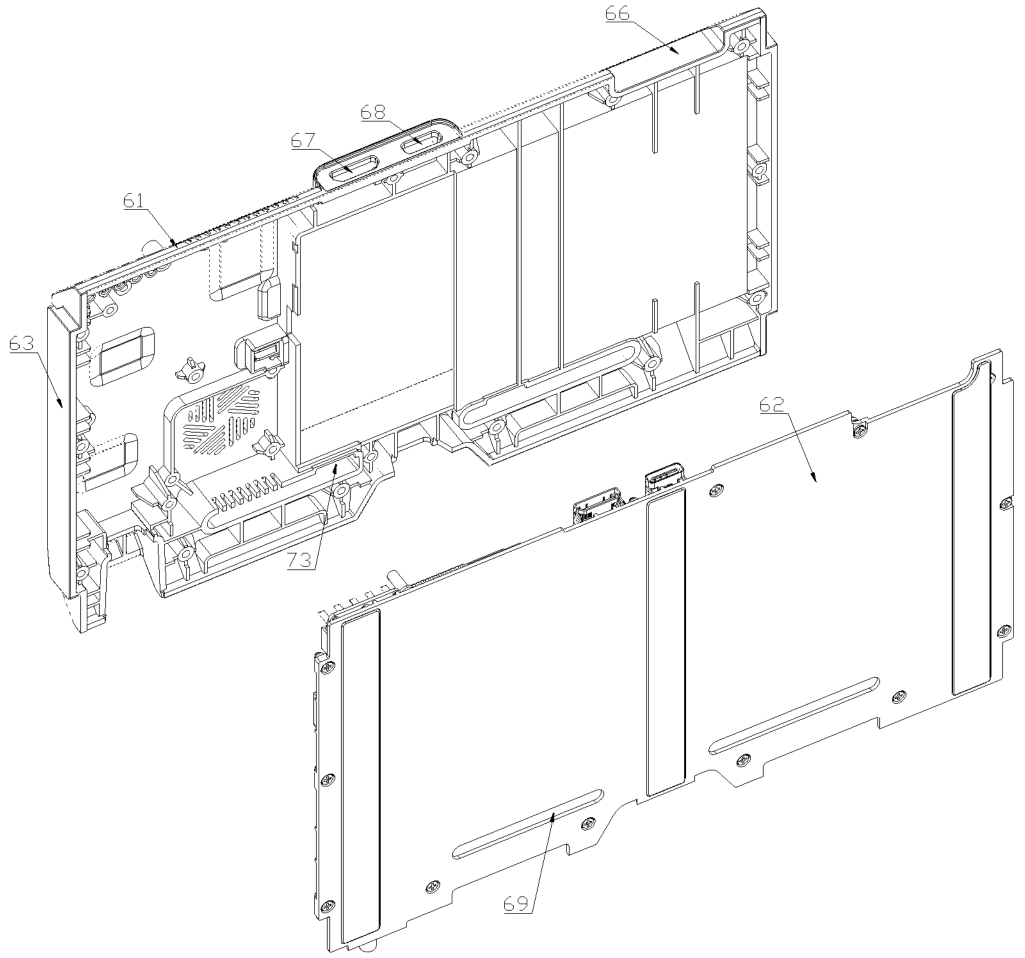
FIG. 19 shows an exploded view of a multifunctional component of a modular assembled display assembly according to an embodiment of the present disclosure.
Figure 20:
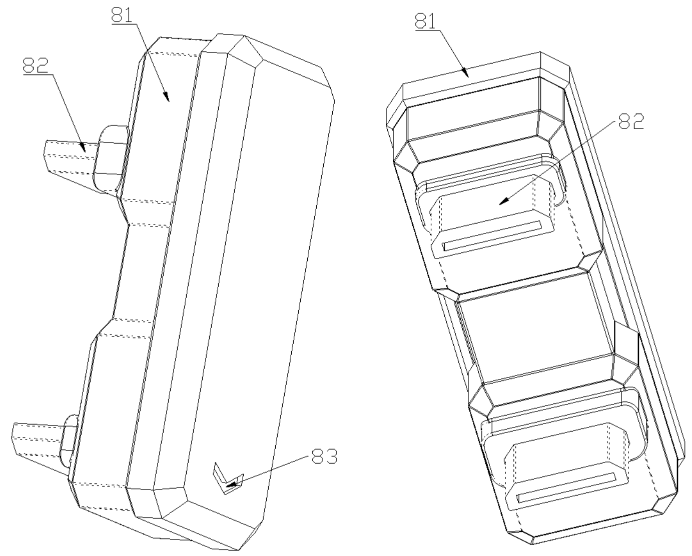
FIG. 20 is a schematic view of a video transmitter of a modular assembled display assembly according to an embodiment of the present disclosure.
Figure 21:
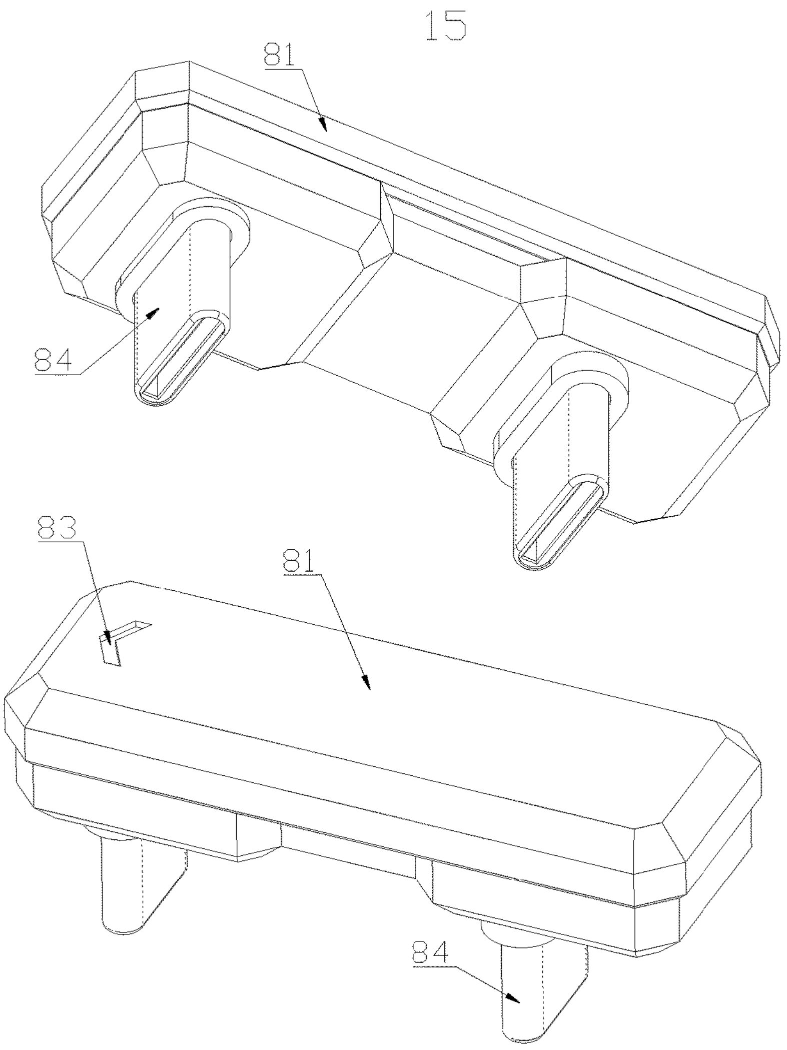
FIG. 21 is a schematic view of an electrical connector of a modular assembled display assembly according to an embodiment of the present disclosure.
Figure 22:
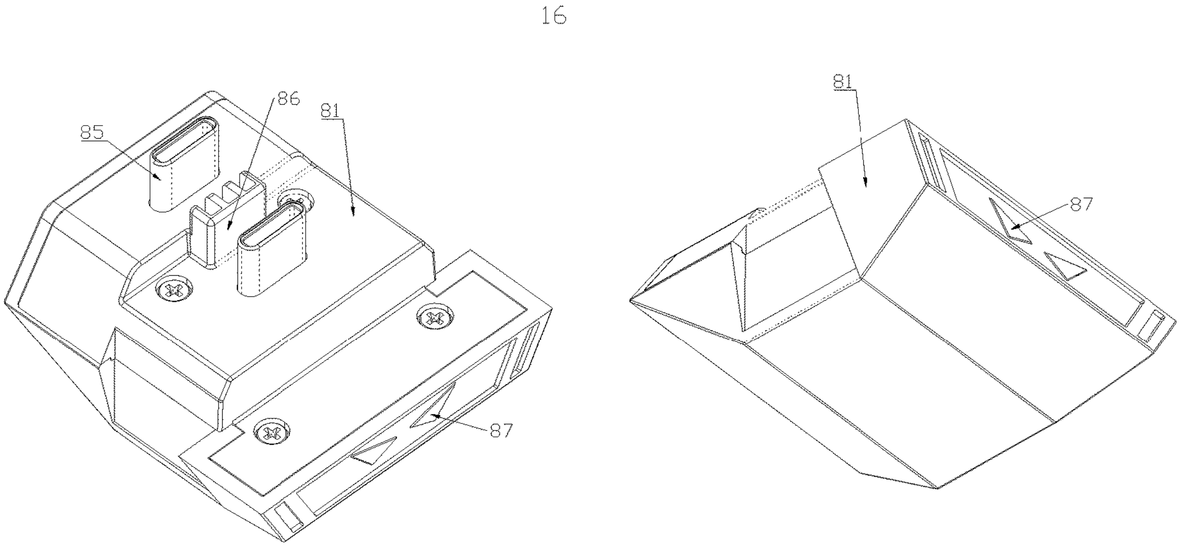
FIG. 22 is a schematic view of a connecting part of a modular assembled display assembly according to an embodiment of the present disclosure.

As shown in FIGS. 13-15, the display screen component 12 is panel-shaped, has an independent display function, and includes a frame 41, a back panel 51 connected with the frame 41, and a display screen 42 arranged in the frame 41. First slide rails 43 are respectively provided on both sides of the display screen component 12, the first slide rails 43 are used to cooperate with first slideways 24 in the gamepad connector 11 and inner slideways in the speaker 17, which will be described later. As an alternative embodiment, first slideways may be provided in both sides of the display screen component 12, and accordingly, corresponding slide rails may be provided on the gamepad connector 11 and the speaker 17 to achieve the same function. Connection sockets 44 are also provided on the side of the display screen component 12 and at the lower end of the first slide rails 43, they cooperate with the first connection plugs 26 on the gamepad connector 11 or the second connection plugs 94 on the speaker 17. As an alternative embodiment, Connection plugs may be provided on the side of the display screen component 12 and at the lower end of the first slide rails 43, and accordingly, connection sockets may be provided on the gamepad connector 11 or the speaker 17. Herein, the connection socket 44 is a 2p connection socket, and the first connection plug 26 and the second connection plug 94 are 2p connection plugs.

The display screen component 12 is provided with a power switch 45, a 3.5 mm headphone jack 46 and function buttons 47, which are provided on the upper side of the frame 41; the display screen component 12 is provided with one or more recesses 55 at the side of the display screen component 12 away from the user, so that there is a gap/gaps between the game console 1 and the display screen component 12 when the game console 1 is accommodated in the accommodation space to facilitate heat dissipation. A first air inlet 53 is provided in the back panel 51, and a first air outlet 48 is provided in the frame 41; a first fan 56 is provided inside the display screen component 12. By means of the design of "recess" on the back of the display screen component, when the display screen component is combined with the front of the Switch game console 1, gaps will be generated between the back of the display screen component and the front of the Switch game console 1. Through the first air inlet on the back of the display screen component, the air flow may be generated in the gap, it can take away the accumulated heat generated on the front surface of the Switch game console 1 when it is running. Herein, on the one hand, it dissipates heat for the internal components of the display screen component itself, and on the other hand, it dissipates heat for the front surface of the Switch game console 1. At least one protrusion 52 or groove is provided in the side of the display screen component 12 facing away from the user; and at least one groove 64 or protrusion is provided on the side of the multifunctional component 13 facing the display screen component 12. A video driver 54 is provided inside the display screen component 12, the video driver 54 is used to process the video signal received by the display screen component 12 into a signal suitable for display by the display screen component 12.

The display screen component 12 is provided with a Type-C type first electrical socket 50 and a mini HDMI type first video socket 49, which are arranged at the top middle position of the frame 41. The Type-C type first electrical socket 50 at the top receives a 5V voltage to power the display screen component 12, and the mini HDMI type first video socket 49 at the top receives an HDMI video signal.

As shown in FIGS. 16-19, the multifunctional component 13 is also panel-shaped. The multifunctional component 13 includes a case 61 and a sealing plate 62 covering the case 61, and second slide rails 63 (second slideways) are provided on both sides of the multifunctional component 13. The multifunctional component 13 has a battery 70 and a power interface 76, and the battery 70 adopts a detachable design. The multifunctional component 13 is provided with a notch 66, and the notch 66 corresponds to the cassette slot of the game console 1. A second air inlet 71 is provided in the side of the multifunctional component 13 away from the display screen component 12, and a second air outlet 72 is provided in the edge side of the multifunctional component 13; a second fan 77 is provided inside the multifunctional component 13. The multifunctional component 13 is provided with penetrate-through vents 69, and the vents 69 correspond to the cooling air inlets of the game console 1. A plurality of stand slots 73 are provided in the side of the multifunctional component 13 away from the display screen component 12. Specifically, it includes three stand slots 73, one is at the top, two are at the bottom, and two stand slots 73 at the bottom are disposed in the vents 69.

The multifunctional component 13 has functions such as video signal conversion, video signal output, and power supply. The multifunctional component 13 is provided with a Type-C type second electrical socket 68 and a mini HDMI type second video socket 67, which are provided at top, middle position of the multifunctional component 13, the Type-C type second electrical socket 68 on the top is used for power supply output, and the mini HDMI type second video socket 67 on the top is used to output HDMI video signals. A switch button 74 and an indicator light 75 are provided on the top side of the case 61 of the multifunctional component 13, next to the side edge. The indicator light 75 includes a power indicator light and a battery indicator light. The multifunctional component 13 is also provided with a Type-C full-function connecting socket 65, which is located in the middle of the bottom of the multifunctional component 13.

The top of the multifunctional component 13 is designed with a notch 66, so that when it is attached to the Switch game console, it is convenient for the Switch game console to insert and remove the cassette; a second air inlet 71, a battery compartment and a battery buckle are provided on the side of the multifunctional component 13 away from the display screen component 12, and side-by-side strip-shaped vents 69 are disposed at the lower position on the same side. When fitting with the Switch game console, the side-by-side strip-shaped vents 69 of the multifunctional component 13 correspond to the cooling air inlets of the Switch game console, so as not to affect the heat dissipation of the Switch game console. At the same time, two stand slots 73 on the left and right are disposed inside the two vents 69, they cooperate with the stand slot on the top to form a "whole stand slot" for installing the stand 18. An air inlet is designed inside the vent 69, it has the same function as the second air inlet 71, to achieve the purpose of sufficient air inlet and heat dissipation. There is a second slide rail 63 on each left and right side of the multifunctional component 13, the second slide rail is connected with the slideway of the "gamepad connector" or the "speaker". The sealing plate 62 of the multifunctional component 13 is designed as a whole-surface heat dissipation plate. When it is attached to the Switch game console, it is used to dissipate heat from the back of the Switch game console. Moreover, it cooperates with the air inlet and air outlet of the multifunctional component 13 to perform heat dissipation for the various parts of the multifunctional component 13.

The multifunctional component 13 has a voltage controller 79 configured to distribute voltage to the second electrical socket 68 and other electrical parts in the multifunctional component 13. The multifunctional component 13 also includes a video signal conversion member 78, which is used to convert video signals into signals suitable for reception by the display screen component 12.

The gamepad connector 11 is a gamepad connector used for gaming devices. The gamepad connector 11 is able to be connected to the gamepad 2, and to be connected to the display screen component 12, the multifunctional component 13 and the game console 1, so that the gamepad 2, the gamepad connector 11, the display screen component 12, the game console 1 and the multifunctional component 13 form a whole. The number of gamepad connectors 11 of the present disclosure is two, and the two gamepad connectors 11 are mirror symmetrical, as shown in FIGS. 8-12, the gamepad connector 11 is composed of a first housing 31 and a second housing 32 connected with the first housing 31, the first housing 31 and the second housing 32 are fixed by means of screws through the fixing posts 34 and the fixing holes 35 shown in the drawing. The first housing 31 and the second housing 32 form an internal space, a circuit board 33 is provided in the internal space. The structure formed by the gamepad connector 11 includes: a base body; and a palm rest 21 connected to the base body. The palm rest 21 has a gamepad slot 22 for receiving the gamepad 2, wherein the base body is able to be connected with the display screen component 12, the multifunctional component 13 and the game console 1, so that the gamepad 2, the controller connector 11, the display screen component 12, the game console 1 and the multifunctional component 13 form a whole. The base body is provided with a loudspeaker 23, the gamepad slot 22 has a shape that is adapted to the gamepad 2; and the palm rest 21 has a curved contour so as to be suitable for human hands to hold.

A first slideway 24 is provided in one side of the base body for connecting with the display screen component 12; and a second slideway 28 is also provided in the one side of the base body for connecting with the multifunctional component 13. The first slideway 24 and the second slideway 28 are arranged in parallel and spaced apart. As an alternative embodiment, a first slide rail is provided on one side of the base body for connecting to the display screen component 12; and a second slide rail is provided on the one side of the base body for connecting to the multifunctional component 13. A first connection plug 26 is provided on the side of the base body facing the display screen component 12, and the first connection plug 26 is used to cooperate with the connection socket 44 of the display screen component 12. The first connection plug 26 is a 2p connection plug. Alternatively, a first connection socket may be provided in the side of the base body facing the display screen component 12, and the first connection socket is used to cooperate with the connection plug of the display screen component 12. A limit seat 25 is provided on the side of the base body facing the game console 1 for limiting the position of the game console 1. The gamepad connector 11 also includes a first lock buckle 29 and a second lock buckle 30. The first lock buckle 29 is used to lock the gamepad 2 to the palm rest 21 to prevent the gamepad 2 from being displaced, and to be fully fixed, the second lock buckle 30 is used to lock the display screen component 12, the multifunctional component 13 and the game console 1 with the gamepad connector 11.

Advantageously, the gamepad connector 11 further includes a limit piece 27, and the limit piece 27 is detachably connected with the base body, so that when the limit piece 27 is not installed on the base body, the gamepad connector 11 is suitable for connecting with a first game console (Switch OLED version), and when the limit piece 27 is installed on the base body, the gamepad connector 11 is suitable for connecting with a second game console (Switch Long Battery Life version). The second game console is different from the first game console, the Switch OLED version and the Switch Long Battery Life version have different widths.

Figure 23:
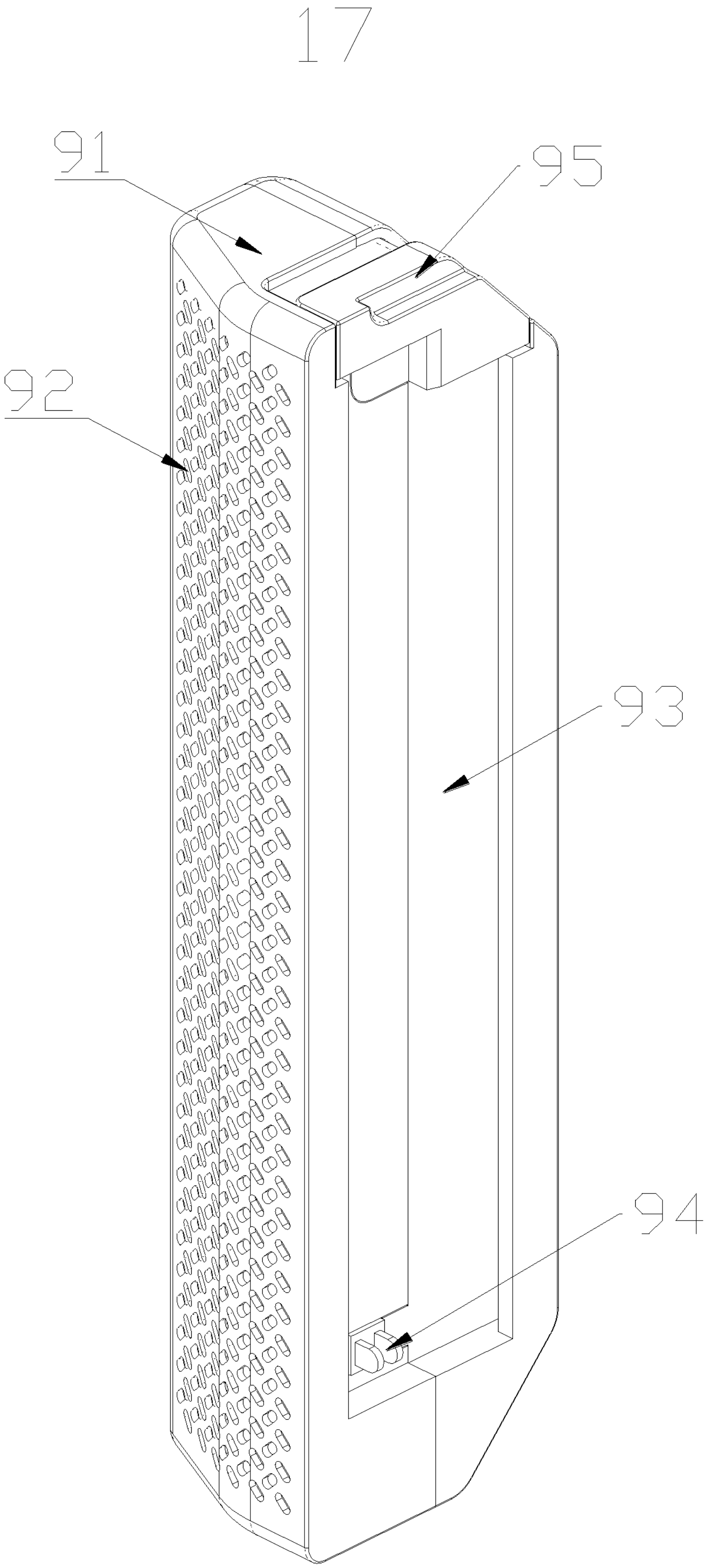
FIG. 23 is a schematic view of a speaker for a gaming device according to an embodiment of the present disclosure.

The number of the speakers 17 of the present disclosure is also two. The two speakers 17 are mirror symmetrical, as shown in FIG. 23, each speaker 17 includes: a longitudinally extended base casing 91 with a speaker mesh 92 provided; and a speaker unit provided in the base casing 91, wherein the speaker 17 is attachable to the display screen component 12 and the multifunctional component 13, so that the display screen component 12 and the multifunctional component 13 are combined together and used as a display.

An attachment element is provided on one side of the base casing 91 of the speaker 17, and the speaker 17 is attached to the display screen component 12 and the multifunctional component 13 through the attachment element. The attachment element is adjacent to the side of the base casing 91 on which the speaker mesh 92 is disposed. Specifically, an inner slideway 93 is provided on the side of the speaker 17 facing the display screen component 12 and the multifunctional component 13. The inner slideway 93 cooperates with the first slide rail 43 of the display screen component 12 and the second slide rail 63 of the multifunctional component 13. Alternatively, one or more slide rails are provided on the side of the speaker 17 facing the display screen component 12 and the multifunctional component 13, and the slide rails cooperate with the first slideway of the display screen component 12 and the second slideway of the multifunctional component 13. A second connection plug 94 is provided on the side of the speaker 17 facing the display screen component 12, and the second connection plug 94 is used to cooperate with the connection socket 44 of the display screen component 12. Alternatively, a second connection socket is provided on the side of the speaker 17 facing the display screen component 12, and the second connection socket is used to cooperate with the connection plug of the display screen component 12. The speaker 17 is provided with a third lock buckle 95, and the third lock buckle 95 is used to fix the speaker 17, the display screen component 12 and the multifunctional component 13 as a whole.

Herein, the way in which the speaker 17 is connected to the display screen component 12 and the multifunctional component 13 is specially designed. When the display assembly of the present disclosure is assembled into a "display state", one side of the back panel 51 of the display screen component 12 is attached to the sealing plate 62 of the multifunctional component 13. The back panel 51 of the display screen component 12 is designed with two protrusions 52, and the multifunctional component 13 is designed with grooves 64 at corresponding positions on the side of the sealing plate 62, it can prevent reverse installation during attachment. The slide rails on both sides of the display screen component 12 and the multifunctional component 13 merge into one slide rail after they are attached, and then slide into the inner slideway 93 of the speaker 17, and then use the third lock buckle 95 above the speaker 17 to fix.

Figure 24:
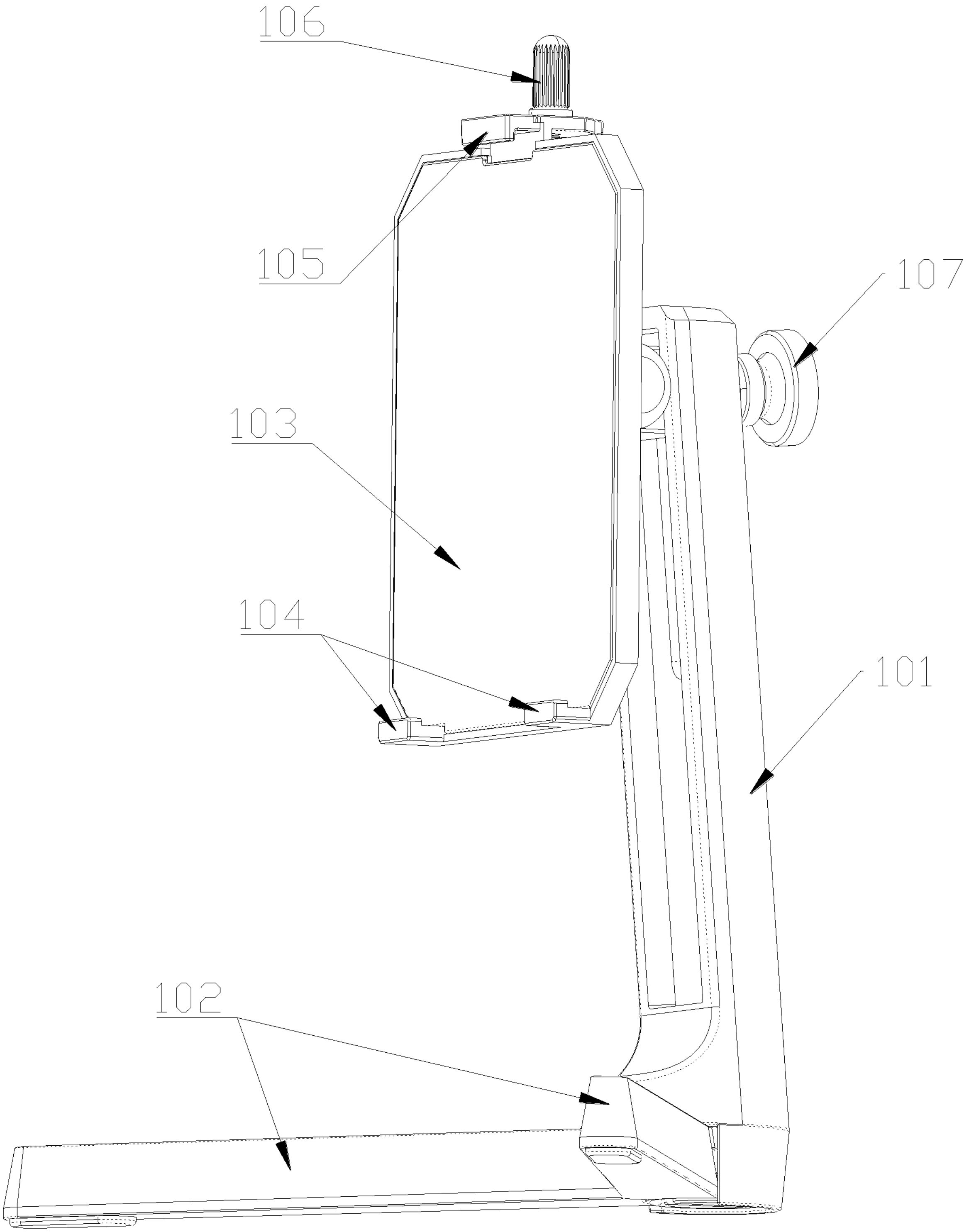
FIG. 24 is a schematic view of a stand of a modular assembled display assembly according to an embodiment of the present disclosure.
Figure 25:
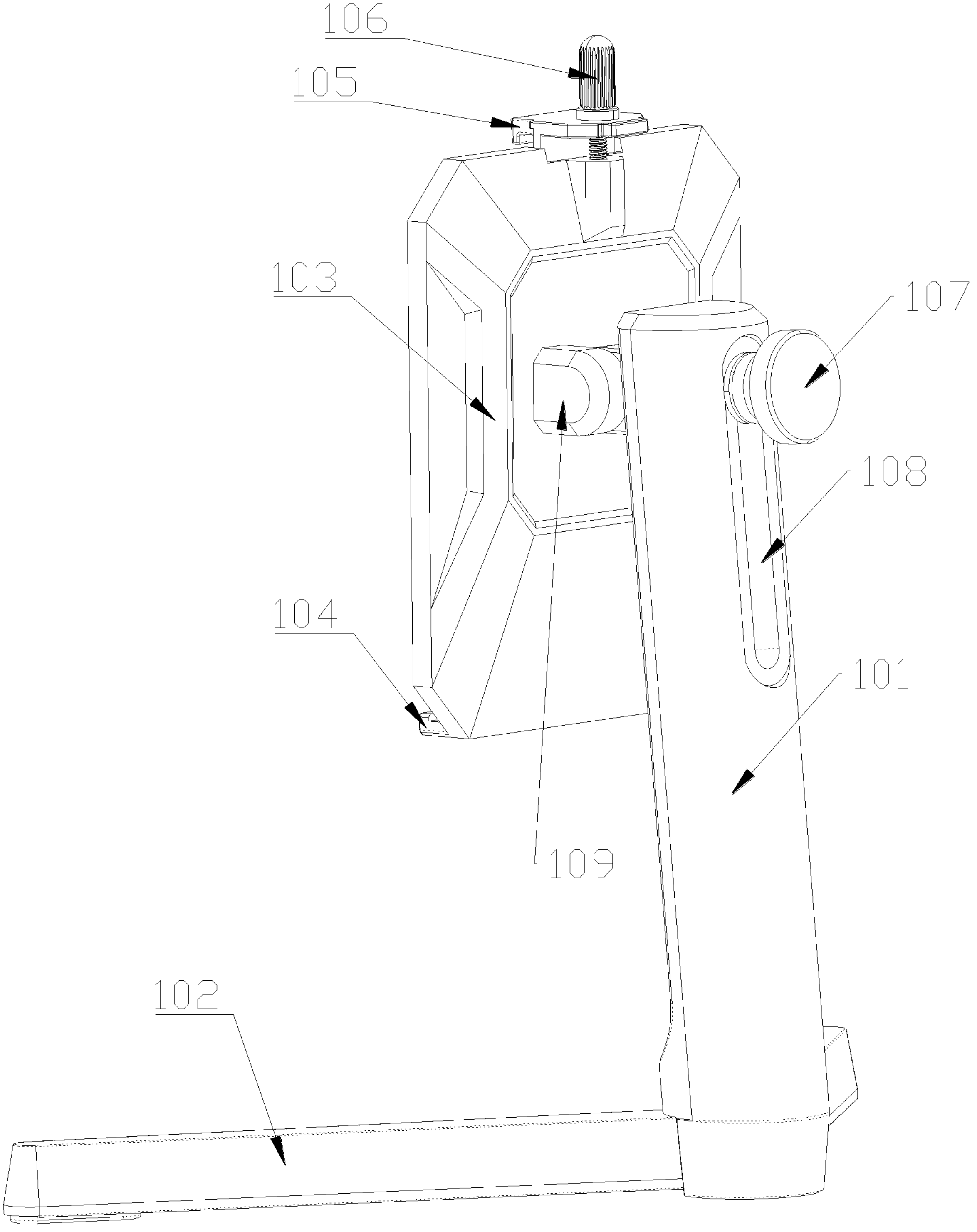
FIG. 25 shows a stand of a modular assembled display assembly according to an embodiment of the present disclosure from another viewing angle.
Figure 26:
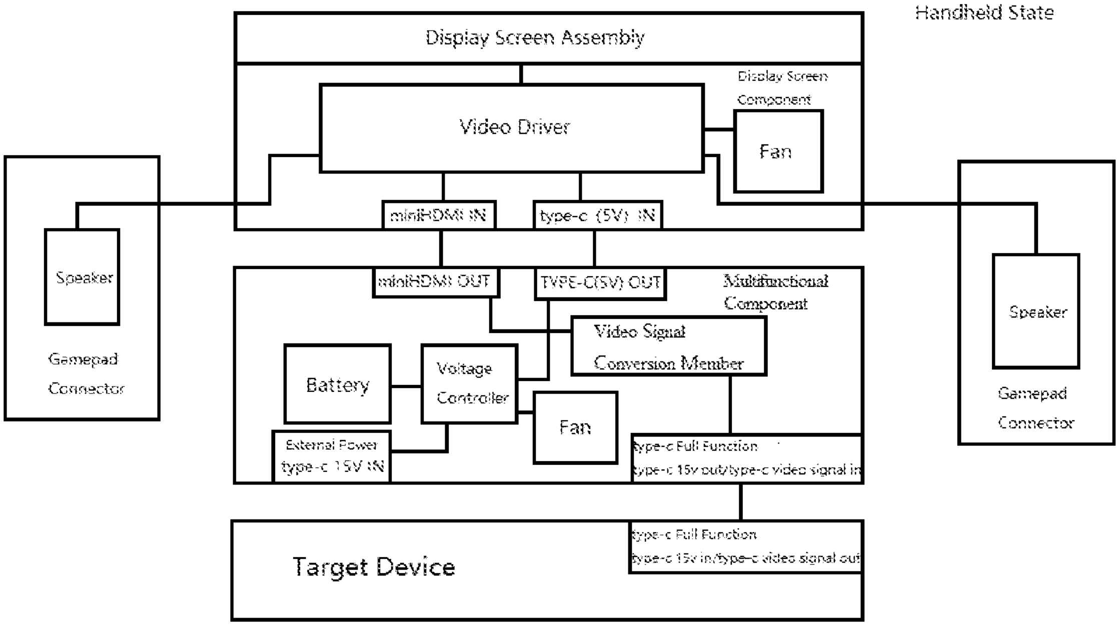
FIG. 26 is a schematic diagram of a modular assembled display assembly in handheld state according to an embodiment of the present disclosure.
Figure 27:
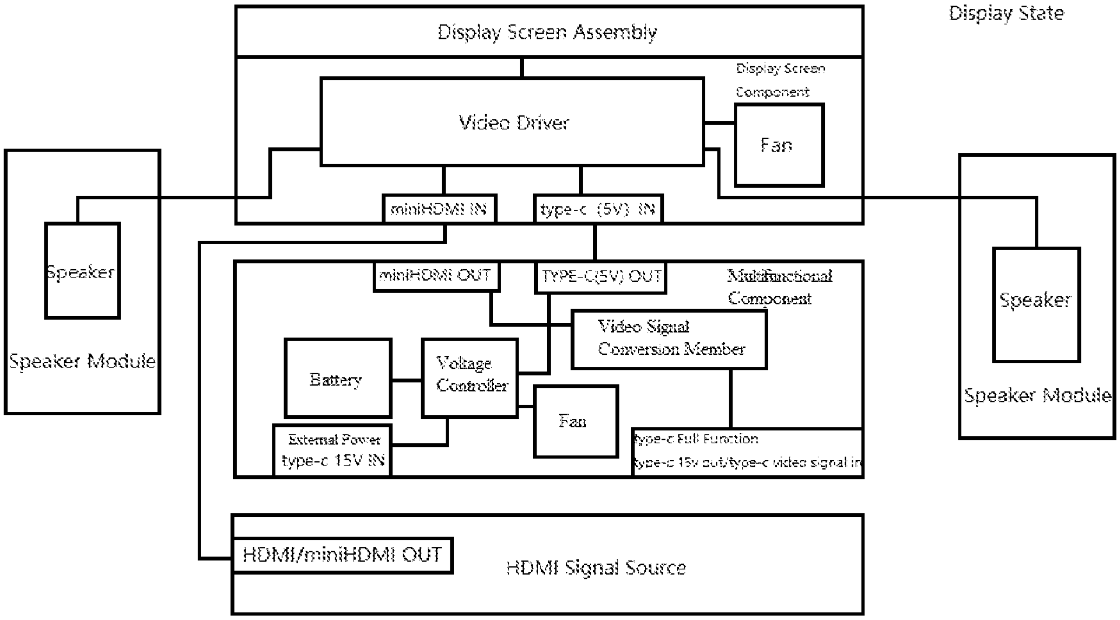
FIG. 27 is a schematic diagram of a modular assembled display assembly in display state according to an embodiment of the present disclosure.

As shown in FIGS. 24-25, the stand 18 includes: an upright strut 101 with a sliding chute 108; two supporting feet 102, which are provided at the lower end of the upright strut 101; a positioning element 107, which is provided in the sliding chute 108 and configured to be slidable and fixable in the sliding chute 108; a damping hinge 109 attached to the positioning element 107, so that the damping hinge 109 can be adjusted in height as the positioning element 107 moves; a fixing plate 103 attached to the damping hinge 109; two lower clamping jaws 104 provided on the fixing plate 103; an upper clamping jaw 105 provided on the fixing plate 103; and an adjusting element 106. At least one of the lower clamping jaw 104 and the upper clamping jaw 105 is a movable clamping jaw, the adjusting element 106 is provided on the movable clamping jaw to adjust the distance between the lower clamping jaws 104 and the upper clamping jaw 105.

The stand 18 can be used in both "handheld state" and "display state". The adjusting element 106 and the positioning element 107 are both bolts. The bolt of the adjusting element 106 is smaller than the bolt of the positioning element 107. In the illustrated embodiment, the upper clamping jaw 105 is movable. After the adjusting element 106 is loosened, the upper clamping jaw 105 can be moved, the two lower clamping jaws 104 may be inserted into the stand slots 73 on the lower side of the multifunctional component 13, and the upper clamping jaw 105 may be inserted into the stand slot 73 on the upper side of the multifunctional component 13, and then tighten the adjusting element 106 to fix the display on the stand 18.

The video transmitter 14 is used to connect the multifunctional component 13 with the display screen component 12 so that the multifunctional component 13 provides video signals to the display screen component 12; the electrical connector 15 is used to electrically connect the multifunctional component 13 with the display screen component 12 so that the multifunctional component 13 provides power to the display screen component 12. The connecting part 16 is configured to connect the game console 1 with the multifunctional component 13, and the connecting part 16 supports current transmission and video signal transmission.

The electrical connector 15 is a Type-C electrical connector, including: a base block 81; and two spaced Type-C electrical plugs 84, which are parallel to each other and extend in the same direction from the base block 81. The two spaced Type-C electrical plugs are respectively connected to the first electrical socket 50 in the display screen component 12 and the second electrical socket 68 in the multifunctional component 13. The display assembly 100 includes two electrical connectors 15, a first electrical connector and a second electrical connector. The distance between the two electrical plugs 84 of the first electrical connector is smaller than the distance between the two electrical plugs 84 of the second electrical connector. The first electrical connector is used to electrically connect the multifunctional component 13 with the display screen component 12 in the display state, and the second electrical connector is used to electrically connect the multifunctional component 13 with the display screen component 12 in the handheld state. In the handheld state, an accommodation space is formed between the display screen component 12 and the multifunctional component 13 so that the game console 1 can be accommodated in the accommodation space. The gap between the display screen component 12 and the multifunctional component 13 becomes larger in the handheld state relative to the display state, so the distance between the two electrical plugs 84 of the second electrical connector is larger.

The video transmitter 14 is a mini HDMI type video transmitter, including: a base block 81; and two spaced apart mini HDMI type video signal plugs 82, which are parallel to each other and extend in the same direction from the base block 81. The two spaced apart mini HDMI type video signal plugs 82 are respectively connected to the first video socket 49 in the display screen component 12 and the second video socket 67 in the multifunctional component 13.

The connecting part 16 is a Type-C full-function connector, including: a base block 81; and two spaced Type-C male plugs 85, which are parallel to each other and extend in the same direction from the base block 81. The two spaced Type-C male plugs 85 are respectively connected to the connecting socket 65 in the multifunctional component 13 and the connecting socket in the game console 1. A limiting member 86 is provided between the two male plugs 85 of the connecting part 16 for limiting the displacement of the game console 1. Advantageously, the video transmitter 14 and/or the electrical connectors 15 are provided with indicating marks 83; the connecting part 16 is provided with a power indicator 87.

The mini HDMI video transmitter has mini HDMI to mini HDMI video signal transmission function. In the "handheld state", it is designed according to the distance and height difference between the video sockets in the "display screen component" and "multifunctional component", and it is installed at the positions of the mini HDMI video sockets in the "display screen component" and "multifunctional component". The electrical connectors 15 are two 5V Type-C connectors, one long and one short, with the function of transmitting 5V voltage from Type-C to Type-C. The long electrical connector 15 is used in "handheld state", designed according to the distance and height difference between the Type-C electrical sockets in the "display screen component" and "multifunctional component", and installed at the positions of the Type-C electrical sockets in the "display screen component" and "multifunctional component". The short electrical connector 15 is used in "display state", designed according to the distance and height difference between the Type-C electrical sockets in the "display screen component" and "multifunctional component", and installed at the positions of the Type-C electrical sockets in the "display screen component" and "multifunctional component". The connecting part 16 is a 15V Type-C connector, with Type-C to Type-C full function, and it supports 100 W current transmission and video signal transmission. The connecting part is used in the "handheld state", designed according to the distance and height difference between the connecting sockets at the bottom of "Switch game console" and "multifunctional component". There is a power indicator on the front of the connecting part, which is an indicator light.

The display assembly of the present disclosure can be assembled into two states based on the above components: "handheld state" and "display state". The "handheld state" is specially designed for the "Switch game console" to meet the portability of the "Switch game console" in the "TV mode", it supports two versions of Switch game console with different sizes, "Switch Long Battery Life version" and "Switch OLED version". The "display state" has a complete and independent display function, the display assembly in this state can be connected to any "signal source" device with HDMI video signal output, for example, "server", "PC computer host", "set-top box", "PS5 game console", "PS4 game console", "xbox game console" and other signal source devices. The assembly, usage and principle of the two states are described in detail below.

I. Assembly, Usage and Principle of "Handheld State":

1. Connect the left and right "gamepad connectors" to the "display screen component" and "multifunctional component", that is, slide the first slide rails of the "display screen component" into the first slideways of the "gamepad connectors", and slide the second slide rails of the "multifunctional component" into the second slideways of the "gamepad connectors".
2. Place the "Switch game console" from top to bottom into the gap between the "display screen component" and "multifunctional component".
3. Lock the "three-in-one buckles" (the second lock buckles) above the left and right "gamepad connectors" and fix the "display screen component", "multifunctional component", left and right "gamepad connectors", and "Switch game console".
4. Place the left and right "separate gamepads" of the "Switch game console" into the "palm rests" of the left and right "gamepad connectors" according to the corresponding directions and positions, and lock the "lock buckles" (the first lock buckle) on the left and right "gamepad connectors" to fix the "separate gamepads".
5. Put the "battery" into the battery compartment of the "multifunctional component" and turn on the switch. The green indicator light lights up to indicate that the device is powered on, and the 4 white indicator lights indicate the battery power.
6. Place the "mini HDMI type video connector" (video transmitter 14) and the "5V Type-C electrical connector (long, electrical connector 15)" side by side according to the corresponding directions and positions, and insert them into the corresponding socket position of the "display screen component" and the "multifunctional component".
7. Insert the "15V Type-C full-function connector (connecting part 16)" into the corresponding socket position of the "Switch game console" and "multifunctional component". At this time, the red indicator light will light up, it means that the "Switch game console" and the "multifunctional component" communicate normally due to the connection of "15V Type-C full-function connector". At this time, the "Switch game console" is in the charging state and the "handheld state" assembly is completed.
8. After pressing the power button of the "Switch game console", the screen lights up in "handheld mode", and displays the video signal of the "Switch game console".
9. Use a charger with USB PD2.0 15V protocol for charging. When the charger is inserted into or unplugged from the power interface at the bottom of the "multifunctional component", the whole device will automatically shut down and cut off all circuits regardless of whether it has been turned on or not, then it will automatically turn on after 5 seconds. In this way, it avoids the superposition of instantaneous double currents (charger current and battery current), thereby avoiding damage to the device.

10. The operating principle is: as shown in FIGS. 1 and 24, in the "handheld state" (including Switch game console/target device), after powering on, the battery or charger transmits the voltage to the "voltage controller" inside the "multifunctional component", the "voltage controller" distributes the corresponding voltage to "video signal conversion member/chip", "second Fan", "various components" and "5V second electrical socket", the voltage of the "5V second electrical socket" reaches the "video driver" inside the "display screen component" through the "5V Type-C electrical connector (long, electrical connector 15)", powers the "components" on the "video driver board", "speaker", "first fan", and "display screen assembly". The "video signal conversion member" inside the "multifunctional component" sends USB PD2.0 protocol information to the "Switch game console". After the "Switch game console" recognizes and reaches an "agreement", the "video signal conversion member" sends "protocol" voltage to the "Switch game console", and the "Switch game console" turns on fast charging, automatically activates the "TV mode", and sends audio and video signals to the "video signal conversion member". The audio and video signals are processed by the "video signal conversion member", then it is changed to an HDMI video signal, then it passes through the "mini HDMI video connector", the HDMI video signal is processed by the "video driver" into a signal that can be recognized and displayed by the "display screen assembly", and finally the picture is presented.

II. Assembly, Usage and Principle of "Display State"

1. Attach the back panel side of the display screen component to the sealing plate side of the multifunctional component. The two fitting surfaces should be aligned with each other so that the convex structure and the concave structure match, to prevent incorrect fitting direction.
2. Connect the left and right "speakers" to the "display screen component" and "multifunctional component", that is, slide the first slideways of the "display screen component" and the second slideways of the "multifunctional component" into the speakers.
3. Lock the "buckles" (the third lock buckles) on the left and right "speakers" and fix the "display screen component", "multifunctional component" and left and right "speakers".
4. Assemble the stand, install the left and right "feet" on the bottom of the upright strut, put the "screws with handles" into the bottom of the upright strut and tighten them manually to fix the left and right "feet" and "upright strut". Place the protruding "square" structure in the middle of the back of the "fixing plate" into the "slide chute" in the upper part of the upright strut (the bolt of the adjusting element on the "fixing plate" is upward), pass the bolt of the positioning element through the upright strut, and tighten manually "fixing plate" to complete the stand assembly.
5. Align the two "lower clamping jaws" on the "fixing plate" of the stand with the stand slots in the "vents" of the "multifunctional component", and insert the "upper clamping jaw" on the "fixing plate" of the stand into the stand slot in the upper edge of the "multifunctional component", and tighten manually the "adjusting element".
6. Insert the "5V Type-C electrical connector (short)" into the corresponding socket position on the "display screen component" and "multifunctional component" according to the corresponding direction and position to complete the "display state" assembly.
7. Connect the signal source to the HDMI video cable, insert it into the mini HDMI video socket of the "display screen component", turn on the switch on the "multifunctional component", and the "display screen component" displays the pictures of the signal source.
8. Charging is the same as that in "I.9".
9. The operating principle is: as shown in FIGS. 5 and 25, in the "display state", after powering on, the battery or charger transmits the voltage to the "voltage controller" inside the "multifunctional component", the "voltage controller" distributes the corresponding voltage to "various components" and "5V second electrical socket". The voltage of the "5V second electrical socket" reaches the "video driver" inside the "display screen component" through the "5V Type-C electrical connector (short)", powers the "components" on the "video driver board", "speaker", "first fan", and "display screen assembly". The HDMI video signal of the signal source is transmitted through the "mini HDMI video socket" of the "display screen component" and processed by the "video driver" into a signal that can be recognized and displayed by the "display assembly", and finally the picture is presented.

Although the embodiments of the present disclosure have been shown and described, it will be understood by those of ordinary skill in the art that changes may be made to these embodiments without departing from the principle and spirit of the present disclosure. The scope of the present disclosure is defined by the appended claims and their equivalents.

What is claimed is:

1. A modular assembled display assembly (100), comprising:

a display screen component (12) configured for displaying video to a user; and a multifunctional component (13) disposed on a side of the display screen component (12) away from the user and configured to provide power to the display screen component (12), wherein a combination of the display screen component (12) and the multifunctional component (13) is configured to realize a display function;

wherein:

the multifunctional component (13) comprises a battery (70) and/or a power interface (76);

the display assembly (100) further comprises an electrical connector (15) configured to electrically connect the multifunctional component (13) with the display screen component (12), so that the multifunctional component (13)) provides power to the display screen component (12);

wherein the electrical connector (15) is a Type-C electrical connector, comprising:

a base block (81); and two spaced Type-C electrical plugs (84), parallel to each other and extending in the same direction from the base block (81), wherein the display screen component (12) and the multifunctional component (13) are respectively provided with a first electrical socket (50) and a second electrical socket (68) which are each Type-C type.

2. The modular assembled display assembly (100) according to claim 1, wherein: the multifunctional component (13) comprises a voltage controller (79) configured to distribute voltage to the second electrical socket (68) and other electrical parts in the multifunctional component (13).

3. The modular assembled display assembly (100) according to claim 1, wherein the display assembly (100) further comprises:

at least one gamepad connector (11) configured to be connected to a gamepad (2), and to be connected to the display screen component (12), the multifunctional component (13) and a game console (1), so that the gamepad (2), the gamepad connector (11), the display screen component (12), the game console (1) and the multifunctional component (13) form a whole;

a video transmitter (14) configured to connect the multifunctional component (13) with the display screen component (12), so that the multifunctional component (13) provides video signal to the display screen component (12); and a connecting part (16) configured for connecting the game console (1) with the multifunctional component (13), and the connecting part (16) supports current transmission and video signal transmission.

4. The modular assembled display assembly (100) according to claim 3, wherein:

the multifunctional component (13) further comprises a video signal conversion member (78) configured to convert video signals into signals suitable for reception by the display screen component (12).

5. The modular assembled display assembly (100) according to claim 3, wherein:

the display assembly (100) has a display state and a handheld state;

in the display state, the display screen component (12) and the multifunctional component (13) are close to each other and combined as a display;

in the handheld state, the gamepad connector (11), the display screen component (12), the multifunctional component (13), the video transmitter (14), the electrical connector (15), and the connecting part (16) are connected to the game console (1) and the gamepad (2) to form a whole and work as a handheld game console.

* * * * *